United States Patent
Chen et al.

(10) Patent No.: US 12,279,215 B2
(45) Date of Patent: Apr. 15, 2025

(54) UPLINK POWER CONTROL METHOD AND APPARATUS DURING HANDOVER

(71) Applicant: HUAWEI TECHNOLOGIES CO., LTD., Guangdong (CN)

(72) Inventors: Ying Chen, Hangzhou (CN); Yunfei Qiao, Hangzhou (CN); Hejia Luo, Hangzhou (CN); Yinggang Du, Shenzhen (CN); Rongdao Yu, Shenzhen (CN); Rong Li, Hangzhou (CN); Jun Wang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 401 days.

(21) Appl. No.: 17/736,501

(22) Filed: May 4, 2022

(65) Prior Publication Data
US 2022/0264484 A1  Aug. 18, 2022

Related U.S. Application Data

(63) Continuation of application No. PCT/CN2020/120286, filed on Oct. 12, 2020.

(30) Foreign Application Priority Data

Nov. 8, 2019 (CN) .......................... 201911090501.2

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/146* (2013.01); *H04W 52/242* (2013.01); *H04W 84/06* (2013.01)

(58) Field of Classification Search
CPC ..... H04W 36/00; H04W 52/16; H04W 52/24; H04W 52/36; H04W 52/14; H04W 84/06;
(Continued)

(56) References Cited

U.S. PATENT DOCUMENTS 8,755,292 B2 *   6/2014  Park et al. .................... 370/252
2011/0039561 A1   2/2011  Narasimha et al.
(Continued)

FOREIGN PATENT DOCUMENTS

CN    103596257 A    2/2014
CN    104254118 A    12/2014
(Continued)

OTHER PUBLICATIONS

Akkarakaran et al. (BR 112019025529 A2) discloses—Power Control in New Radio Systems (see title) (Year: 2020).*
(Continued)

*Primary Examiner* — Meless N Zewdu
(74) *Attorney, Agent, or Firm* — Fish & Richardson P.C.

(57) ABSTRACT

The present disclosure relates to power control methods and apparatuses. In one example method, a first uplink transmit power for a terminal device communicating with a source network device is adjusted, based on a first parameter, to obtain a second uplink transmit power, where the second uplink transmit power is used to communicate with a target network device in a handover process.

20 Claims, 4 Drawing Sheets

(51) Int. Cl.
*H04W 52/24* (2009.01)
*H04W 84/06* (2009.01)

(58) Field of Classification Search
CPC ..... H04W 52/18; H04W 52/48; H04W 36/08; H04W 56/00; H04W 40/02; H04W 40/08; H04W 40/10; H04W 40/12; H04W 52/00; H04W 52/02; H04W 52/0219; H04W 52/0235; H04W 52/143; H04W 52/146; H04W 52/386; H04W 52/30; H04W 72/0473; H04W 36/00838; H04W 36/305; H04W 36/0079; H04W 36/13; H04W 36/085; H04W 36/037; H04W 52/367; H04W 52/242; H04W 52/243; H04W 52/365; H04W 52/27; H04W 24/00; H04W 24/02; H04W 36/0005; H04W 36/0085; H04B 7/26; H04B 7/185; H04B 7/18543; H04B 7/18545; H04B 7/18547; H04B 7/1855; H04B 10/07955; H04B 10/293; H04B 10/564; H04B 10/60; H04B 17/103; H04B 17/327; H04B 17/3912

See application file for complete search history.

(56) References Cited

U.S. PATENT DOCUMENTS

| | | | | |
|---|---|---|---|---|
| 2012/0282970 | A1* | 11/2012 | Kela et al. | 455/522 |
| 2013/0084913 | A1* | 4/2013 | Gaal et al. | 455/522 |
| 2016/0112961 | A1* | 4/2016 | Zhang et al. | H04W 52/146 |
| 2018/0176948 | A1* | 6/2018 | Islam et al. | H04W 74/008 |
| 2018/0324714 | A1* | 11/2018 | Yang et al. | H04W 52/365 |
| 2018/0376429 | A1* | 12/2018 | Islam et al. | H04W 52/146 |
| 2019/0007948 | A1* | 1/2019 | Vajapeyam et al. | H04W 52/14 |
| 2019/0239168 | A1* | 8/2019 | Li et al. | H04W 52/346 |
| 2020/0022087 | A1* | 1/2020 | Dou | H04W 52/146 |
| 2020/0022097 | A1* | 1/2020 | Wang et al. | H04W 52/38 |

FOREIGN PATENT DOCUMENTS

| | | |
|---|---|---|
| CN | 104735738 A | 6/2015 |
| CN | 107645766 A | 1/2018 |
| CN | 108632971 A | 10/2018 |
| CN | 108810960 A | 11/2018 |
| CN | 108886724 A | 11/2018 |
| CN | 109600826 A | 4/2019 |
| CN | 110662281 A | 1/2020 |
| EP | 3439374 A1 | 2/2019 |
| GB | 2582662 A | 9/2020 |
| WO | 2008038980 A1 | 4/2008 |
| WO | 2011105806 A2 | 9/2011 |
| WO | 2018171544 A1 | 9/2018 |
| WO | 2018197930 A1 | 11/2018 |
| WO | 2019095111 A1 | 5/2019 |

OTHER PUBLICATIONS (CN 108632971 A) discloses—Power Control Method, Terminal And Network Device (see title) (Year: 2018).*
(CN 108712776 A) discloses—Used For Transmit Power Control Method And Device (see title) (Year: 2018).*
(WO 2014172865 A1) discloses—Method for Controlling Uplink Transmission Power of Inter-Base Station Carrier Aggregation, Base Station and Device (see title) (Year: 2014).*
(CN 108886724 A)—transmission System And Method Of Connection Management In A Wireless Communication System (title) (Year: 2018).*
(JP 5706006 B2)—Apparatus, Method And System For Uplink Control Channel Reception In Heterogeneous Wireless Communication Networks (see title) (Year: 2015).*
Yang, Ning (WO 2019095111 A1)—Method for Adjusting Uplink Transmission Power, User Equipment and Network Device (see title) (Year: 2019).*
Dai et al. (WO 2014172865 A1)—Method for Controlling Uplink Transmission Power of Inter-Base Station Carrier Aggregation, Base Station and Device (see title) (Year: 2014).*
Extended European Search Report in European Appln No. 20884863.0, dated Nov. 9, 2022, 10 pages.
Ericsson, "On UL power control for NTN," 3GPP TSG-RAN WG1 Meeting #95, Tdoc R1-1813368, Spokane, USA, Nov. 12-16, 2018, 2 pages.
Nomor Research GmbH et al., "Considerations on MAC Control Loops and Timings in Non-Terrestrial Networks (NTN)," 3GPP TSG-RAN WG2 Meeting # 103-Bis, R2-1813615, Chengdu, China, Oct. 8-12, 2018, 6 pages.
Office Action issued in Chinese Application No. 201911090501.2 on May 16, 2022, 6 pages (with English translation).
Office Action issued in Chinese Application No. 201911090501.2 on Oct. 27, 2021, 16 pages (with English translation).
PCT International Search Report and Written Opinion issued in International Application No. PCT/CN2020/120286 on Dec. 31, 2020, 15 pages (with English translation).

* cited by examiner

UPLINK POWER CONTROL METHOD AND APPARATUS DURING HANDOVER

CROSS-REFERENCE TO RELATED APPLICATIONS

This application is a continuation of International Patent Application No. PCT/CN2020/120286, filed on Oct. 12, 2020, which claims priority to Chinese Patent Application No. 201911090501.2, filed on Nov. 8, 2019. The disclosures of the aforementioned applications are hereby incorporated by reference in their entireties.

TECHNICAL FIELD

This application relates to the communication field, and in particular, to a power control method and apparatus in the communication field.

BACKGROUND

With development of information technologies, communication is urgently required to be high efficient, mobile, and diverse. Currently, global mobile communication is one development focus in the communication system field, and satellite communication is an important part of global mobile communication. Satellites play an irreplaceable role in some important fields such as space communication, aeronautical communication, maritime communication, and military communication. Satellite communication has advantages of a long communication distance, a large coverage area, and flexible networking, and can provide services for various mobile terminals and fixed terminals.

The 3rd generation partnership project (3GPP) standard organization has published a 5th generation mobile network (5G) technology standard, to research a communication technology covering the space and the ground. The technology mainly integrates the existing 5G standard with a satellite communication technology, to implement global coverage.

How to perform power control in a communication system integrating 5G communication with satellite communication is a problem that urgently needs to be resolved.

SUMMARY

This application provides a power control method and apparatus, to perform power control in a communication system integrating terrestrial communication with satellite communication.

According to a first aspect, a power control method is provided. The method is performed by a terminal device or a component (for example, a chip or a circuit) that may be configured in a terminal device. The following is described by using an example in which the method is performed by the terminal device.

In the method, the terminal device adjusts, based on a first parameter, a first uplink transmit power used when the terminal device communicates with a source network device, to determine a second uplink transmit power used when the terminal device communicates with a target network device, where a path loss between the terminal device and the source network device is different from a path loss between the terminal device and the target network device, and the first parameter includes a first compensation value (which may be denoted as $\Delta P_{HO}$) of the first uplink transmit power and/or a second compensation value (which may be denoted as N) of a path loss factor corresponding to the first uplink transmit power.

The terminal device communicates with the target network device at the second uplink transmit power in a process in which the terminal device hands over from the source network device to the target network device.

Therefore, in this embodiment of this application, the first uplink transmit power used when the terminal device communicates with the source network device is adjusted based on the first parameter, to obtain the second uplink transmit power, and the second uplink transmit power is used to communicate with the target network device in the handover process. Based on the foregoing description, in this embodiment of this application, when the path loss between the terminal device and the source network device is different from the path loss between the terminal device and the target network device, an uplink power used when the terminal device communicates with the target network device can be controlled in the handover process of the terminal device.

For example, when the path loss between the terminal device and the target network device is greater than the path loss between the terminal device and the source network device, positive power compensation may be performed on the first uplink transmit power, so that a second uplink transmit power is greater than a first uplink transmit power. Therefore, the second uplink transmit power can compensate for a path loss and fading on a radio channel. This improves communication quality between the terminal device and the target network device.

For another example, when the path loss between the terminal device and the target network device is less than the path loss between the terminal device and the source network device, negative power compensation may be performed on the first uplink transmit power, so that the second uplink transmit power is less than a first uplink transmit power. This reduces extra interference to another user on a same radio resource. In addition, usage time of a battery of the terminal device can be further prolonged by reducing the uplink transmit power of the terminal device.

For example, when the first parameter is $\Delta P_{HO}$, the second uplink transmit power may be a sum of the first uplink transmit power and $\Delta P_{HO}$. In other words, the second uplink transmit power may be obtained by adding $\Delta P_{HO}$ to the first uplink transmit power used when the terminal device communicates with the source network device.

In this embodiment of this application, a value of $\Delta P_{HO}$ may be a positive number, a negative number, or 0. This is not limited in this embodiment of this application.

For another example, when the first parameter is N, a path loss factor (which may be denoted as $\alpha_2$) corresponding to the second uplink transmit power may be a sum, namely, ($\alpha_1$+N), or a product, namely, ($\alpha_1 \times N$, $\alpha_1 \cdot N$, or $\alpha_1 N$), of N and the path loss factor $\alpha_1$ corresponding to the first uplink transmit power. In other words, the path loss factor $\alpha_2$ corresponding to the second uplink transmit power may be obtained by multiplying N and the path loss factor $\alpha_1$ corresponding to the first uplink transmit power or adding N to the path loss factor $\alpha_1$ corresponding to the first uplink transmit power used when the terminal device communicates with the source network device.

In this embodiment of this application, when the path loss factor corresponding to the second uplink transmit power is the sum of N and the path loss factor corresponding to the first uplink transmit power, a value of N may be a positive number, a negative number, or 0. When the path loss factor corresponding to the second uplink transmit power is the product of N and the path loss factor corresponding to the first uplink transmit power, a value of N may be a positive number or a negative number.

Therefore, in this embodiment of this application, when the path loss between the terminal device and the target network device is greater than the path loss between the terminal device and the source network device, positive compensation is performed on the path loss factor corresponding to the first uplink transmit power, so that the second uplink transmit power is greater than the first uplink transmit power. When the path loss between the terminal device and the target network device is less than the path loss between the terminal device and the source network device, negative compensation is performed on the path loss factor corresponding to the first uplink transmit power, so that the second uplink transmit power is less than the first uplink transmit power. Therefore, uplink transmit powers that meet communication between the terminal device and the target network device can be obtained in different handover scenarios.

With reference to the first aspect, in some implementations of the first aspect, the first parameter is determined based on a delay parameter and/or a distance parameter between the terminal device and the source network device, and a delay parameter and/or a distance parameter between the terminal device and the target network device.

In an implementation of this application, a height of a network device is related to a distance between the terminal device and the network device, for example, as the height of the network device increases, the distance between the terminal device and the network device increases. Therefore, the first parameter may be determined based on a distance between the terminal device and the source network device, and a distance between the terminal device and the target network device. In some optional embodiments, when network devices are classified by height, the first parameter may be determined based on a type of the source network device and a type of the target network device.

In another implementation of this application, the terminal device may determine the first parameter based on a common delay difference (which may be represented as $\Delta TA_{common}$) between the terminal device and the source network device and the target network device. The common delay difference is a difference between a common delay between the terminal device and the source network device and a common delay between the terminal device and the target network device.

With reference to the first aspect, in some implementations of the first aspect, the second uplink transmit power is less than or equal to a maximum uplink transmit power of the terminal device.

In an implementation, when an uplink transmit power that is used when the terminal device communicates with the target network device and that is obtained through calculation in the foregoing manner is greater than the maximum uplink transmit power of the terminal device, the second uplink transmit power used when the terminal device actually communicates with the target network device may be the maximum uplink transmit power of the terminal device.

In another implementation, when the path loss between the terminal device and the source network device is different from the path loss between the terminal device and the target network device, and the terminal device hands over from the source network device to the target network device, the terminal device communicates with the target network device at the maximum uplink transmit power.

In this way, the terminal device may not need to obtain, through complex calculation, the uplink transmit power used when the terminal device communicates with the target network device. This can reduce complexity of the terminal device. In addition, when the terminal device communicates with the network device at the maximum uplink transmit power, the terminal device may not need to report power headroom to the network device. This can reduce signaling overheads.

In this embodiment of this application, the second uplink transmit power may be determined in an open-loop power control manner or a closed-loop power control manner.

In an implementation, when the open-loop power control manner is used, the terminal device may determine the first parameter based on the delay parameter and/or the distance parameter between the terminal device and the source network device, and the delay parameter and/or the distance parameter between the terminal device and the target network device.

In another implementation, when the closed-loop power control manner is used, the target network device may determine the first parameter based on the delay parameter and/or the distance parameter between the terminal device and the source network device, and the delay parameter and/or the distance parameter between the terminal device and the target network device. Then, the target network device sends first indication information to the terminal device, where the first indication information is used to indicate the first parameter. Correspondingly, the terminal device may further receive the first indication information.

In a possible implementation, the first indication information may be carried in radio resource control (RRC) signaling, for example, an RRC reconfiguration message.

With reference to the first aspect, in some implementations of the first aspect, after handing over from the source network device to the target network device, the terminal device may further determine a third uplink transmit power, where the third uplink transmit power is determined based on at least one of a transmit power of the terminal device and the path loss between the terminal device and the target network device. Then, the terminal device communicates with the target network device at the third uplink transmit power.

Therefore, in this embodiment of this application, the terminal device obtains the third uplink transmit power based on at least one of the transmit power of the terminal device and/or the path loss between the terminal device and the target network device, and communicates with the network device at the third uplink transmit power. Based on the foregoing description, in this embodiment of this application, in a scenario in which a terrestrial terminal device communicates with a satellite network device, the uplink transmit power of the terminal device can be more flexibly controlled.

With reference to the first aspect, in some implementations of the first aspect, the terminal device may further receive second indication information, where the second indication information is used to indicate the third uplink transmit power. For example, the terminal device may receive the second indication information from the target network device. In this way, power control can be performed in the closed-loop power control manner.

With reference to the first aspect, in some implementations of the first aspect, the third uplink transmit power is the maximum uplink transmit power of the terminal device, or an uplink transmit power determined in a pre-configured uplink power control manner.

Therefore, in this embodiment of this application, the uplink transmit power may not need to be calculated, and communication with the network device is directly performed at the maximum uplink transmit power. This can reduce complexity of the terminal device. In addition, when the terminal device communicates with the network device at the maximum uplink transmit power, the terminal device may not need to report power headroom (headroom report) to the network device. This can reduce signaling overheads.

According to a second aspect, a power control method is provided. The method is performed by a target network device or a component (for example, a chip or a circuit) that may be configured in a target network device. The following is described by using an example in which the method is performed by the target network device.

In the method, the target network device determines a first parameter, where the first parameter is used to adjust a first uplink transmit power used when a terminal device communicates with a source network device, to obtain a second uplink transmit power used when the terminal device communicates with the target network device, the first parameter includes a first compensation value of the first uplink transmit power and/or a second compensation value of a path loss factor corresponding to the first uplink transmit power, and a path loss between the terminal device and the source network device is different from a path loss between the terminal device and the target network device.

The target network device sends first indication information to the terminal device, where the first indication information is used to indicate the first parameter.

Therefore, in this embodiment of this application, the first uplink transmit power used when the terminal device communicates with the source network device is adjusted based on the first parameter, to obtain the second uplink transmit power, and the second uplink transmit power is used to communicate with the target network device in a handover process. Based on the foregoing description, in this embodiment of this application, when the path loss between the terminal device and the source network device is different from the path loss between the terminal device and the target network device, an uplink power used when the terminal device communicates with the target network device can be controlled in the handover process of the terminal device.

For example, when the path loss between the terminal device and the target network device is greater than the path loss between the terminal device and the source network device, positive power compensation may be performed on the first uplink transmit power, so that a second uplink transmit power is greater than a first uplink transmit power. Therefore, the second uplink transmit power can compensate for a path loss and fading on a radio channel. This improves communication quality between the terminal device and the target network device.

For another example, when the path loss between the terminal device and the target network device is less than the path loss between the terminal device and the source network device, negative power compensation may be performed on the first uplink transmit power, so that a second uplink transmit power is less than a first uplink transmit power. This reduces extra interference to another user on a same radio resource. In addition, usage time of a battery of the terminal device can be further prolonged by reducing the uplink transmit power of the terminal device.

For example, when the first parameter is $\Delta P_{HO}$, the second uplink transmit power may be a sum of the first uplink transmit power and $\Delta P_{HO}$. In other words, the second uplink transmit power may be obtained by adding $\Delta P_{HO}$ to the first uplink transmit power used when the terminal device communicates with the source network device.

In this embodiment of this application, a value of $\Delta P_{HO}$ may be a positive number, a negative number, or 0. This is not limited in this embodiment of this application.

For another example, when the first parameter is N, a path loss factor (which may be denoted as $\alpha_2$) corresponding to the second uplink transmit power may be a sum, namely, $(\alpha_1+N)$, or a product, namely, $(\alpha_1 \times N, \alpha_1 \cdot N,$ or $\alpha_1 N)$, of N and the path loss factor $\alpha_1$ corresponding to the first uplink transmit power. In other words, the path loss factor $\alpha_2$ corresponding to the second uplink transmit power may be obtained by multiplying N and the path loss factor $\alpha_1$ corresponding to the first uplink transmit power or adding N to the path loss factor $\alpha_1$ corresponding to the first uplink transmit power used when the terminal device communicates with the source network device.

In this embodiment of this application, when the path loss factor corresponding to the second uplink transmit power is the sum of N and the path loss factor corresponding to the first uplink transmit power, a value of N may be a positive number, a negative number, or 0. When the path loss factor corresponding to the second uplink transmit power is the product of N and the path loss factor corresponding to the first uplink transmit power, a value of N may be a positive number or a negative number.

Therefore, in this embodiment of this application, when the path loss between the terminal device and the target network device is greater than the path loss between the terminal device and the source network device, positive compensation is performed on the path loss factor corresponding to the first uplink transmit power, so that the second uplink transmit power is greater than the first uplink transmit power. When the path loss between the terminal device and the target network device is less than the path loss between the terminal device and the source network device, negative compensation is performed on the path loss factor corresponding to the first uplink transmit power, so that the second uplink transmit power is less than the first uplink transmit power. Therefore, uplink transmit powers that meet communication between the terminal device and the target network device can be obtained in different handover scenarios.

With reference to the second aspect, in some implementations of the second aspect, the first parameter is determined based on a delay parameter and/or a distance parameter between the terminal device and the source network device, and a delay parameter and/or a distance parameter between the terminal device and the target network device.

In an implementation of this application, a height of a network device is related to a distance between the terminal device and the network device, for example, as the height of the network device increases, the distance between the terminal device and the network device increases. Therefore, the first parameter may be determined based on a distance between the terminal device and the source network device, and a distance between the terminal device and the target network device. In some optional embodiments, when network devices are classified by height, the first parameter may be determined based on a type of the source network device and a type of the target network device.

In another implementation of this application, the terminal device may determine the first parameter based on a common delay difference (which may be represented as $\Delta TA_{common}$) between the terminal device and the source network device and the target network device. The common delay difference is a difference between a common delay between the terminal device and the source network device and a common delay between the terminal device and the target network device.

With reference to the second aspect, in some implementations of the second aspect, the second uplink transmit power is less than or equal to a maximum uplink transmit power of the terminal device.

In an implementation, when an uplink transmit power that is used when the terminal device communicates with the target network device and that is obtained through calculation in the foregoing manner is greater than the maximum uplink transmit power of the terminal device, the second uplink transmit power used when the terminal device actually communicates with the target network device may be the maximum uplink transmit power of the terminal device.

In another implementation, when the path loss between the terminal device and the source network device is different from the path loss between the terminal device and the target network device, and the terminal device hands over from the source network device to the target network device, the terminal device communicates with the target network device at the maximum uplink transmit power.

In this way, the terminal device may not need to obtain, through complex calculation, the uplink transmit power used when the terminal device communicates with the target network device. This can reduce complexity of the terminal device. In addition, when the terminal device communicates with the network device at the maximum uplink transmit power, the terminal device may not need to report power headroom to the network device. This can reduce signaling overheads.

In this embodiment of this application, when the closed-loop power control manner is used, the target network device may determine the first parameter based on the delay parameter and/or the distance parameter between the terminal device and the source network device, and the delay parameter and/or the distance parameter between the terminal device and the target network device. Then, the first indication information is sent to the terminal device, where the first indication information is used to indicate the first parameter.

In a possible implementation, the first indication information may be carried in RRC signaling, for example, an RRC reconfiguration message.

With reference to the second aspect, in some implementations of the second aspect, the method further includes: determining a third uplink transmit power based on at least one of a transmit power of the terminal device and the path loss between the terminal device and the target network device; and sending second indication information to the terminal device, where the second indication information is used to indicate the third uplink transmit power.

Therefore, in this embodiment of this application, the terminal device obtains the third uplink transmit power based on at least one of the transmit power of the terminal device and/or the path loss between the terminal device and the target network device, and communicates with the target network device at the third uplink transmit power. Based on the foregoing description, in this embodiment of this application, in a scenario in which a terrestrial terminal device communicates with a satellite network device, the uplink transmit power of the terminal device can be more flexibly controlled.

With reference to the second aspect, in some implementations of the second aspect, the third uplink transmit power is the maximum uplink transmit power of the terminal device, or an uplink transmit power determined in a pre-configured uplink power control manner.

Therefore, in this embodiment of this application, the uplink transmit power may not need to be calculated, and communication with the network device is directly performed at the maximum uplink transmit power. This can reduce complexity of the terminal device. In addition, when the terminal device communicates with the network device at the maximum uplink transmit power, the terminal device may not need to report power headroom to the network device. This can reduce signaling overheads.

According to a third aspect, a power control method is provided. The method is performed by a terminal device or a component (for example, a chip or a circuit) that may be configured in a terminal device. The following is described by using an example in which the method is performed by the terminal device.

In the method, the terminal device determines a third uplink transmit power, where the third uplink transmit power is determined based on at least one of a transmit power of the terminal device and a path loss between the terminal device and a network device. Then, the terminal device communicates with the network device at the third uplink transmit power.

Therefore, in this embodiment of this application, the terminal device obtains the third uplink transmit power based on at least one of the transmit power of the terminal device and/or the path loss between the terminal device and the network device, and communicates with the network device at the third uplink transmit power. Based on the foregoing description, in this embodiment of this application, in a scenario in which a terrestrial terminal device communicates with a satellite network device, the uplink transmit power of the terminal device can be more flexibly controlled.

In this embodiment of this application, the third uplink transmit power may be determined in an open-loop power control manner or a closed-loop power control manner.

In an implementation, when the open-loop power control manner is used, the terminal device may determine the third uplink transmit power based on at least one of the transmit power of the terminal device and the path loss between the terminal device and the network device.

In an implementation, when the closed-loop power control manner is used, the network device may determine the third uplink transmit power based on at least one of the transmit power of the terminal device and the path loss between the terminal device and the network device. Then, the terminal device receives second indication information, where the second indication information is used to indicate the third uplink transmit power.

With reference to the third aspect, in some implementations of the third aspect, the third uplink transmit power is a maximum uplink transmit power of the terminal device, or an uplink transmit power determined in a pre-configured uplink power control manner.

Therefore, in this embodiment of this application, the uplink transmit power may not need to be calculated, and communication with the network device is directly performed at the maximum uplink transmit power. This can reduce complexity of the terminal device. In addition, when the terminal device communicates with the network device at the maximum uplink transmit power, the terminal device may not need to report power headroom to the network device. This can reduce signaling overheads.

According to a fourth aspect, a power control method is provided. The method is performed by a network device or a component (for example, a chip or a circuit) that may be configured in a network device. The following is described by using an example in which the method is performed by the network device.

In the method, the network device determines a third uplink transmit power based on at least one of a transmit power of a terminal device and a path loss between the terminal device and the network device. Then, the network device sends second indication information to the terminal device, where the second indication information is used to indicate the third uplink transmit power.

Therefore, in this embodiment of this application, the terminal device obtains the third uplink transmit power based on at least one of the transmit power of the terminal device and/or the path loss between the terminal device and the network device, and communicates with the network device at the third uplink transmit power. Based on the foregoing description, in this embodiment of this application, in a scenario in which a terrestrial terminal device communicates with a satellite network device, the uplink transmit power of the terminal device can be more flexibly controlled.

With reference to the fourth aspect, in some implementations of the fourth aspect, the third uplink transmit power is a maximum uplink transmit power of the terminal device, or an uplink transmit power determined in a pre-configured uplink power control manner.

Therefore, in this embodiment of this application, the uplink transmit power may not need to be calculated, and communication with the network device is directly performed at the maximum uplink transmit power. This can reduce complexity of the terminal device. In addition, when the terminal device communicates with the network device at the maximum uplink transmit power, the terminal device may not need to report power headroom to the network device. This can reduce signaling overheads.

According to a fifth aspect, an embodiment of this application provides a communication apparatus, configured to perform the method in any one of the first aspect to the fourth aspect or the possible implementations of the first aspect to the fourth aspect. Specifically, the apparatus includes a module configured to perform the method in any one of the first aspect to the fourth aspect or the possible implementations of the first aspect to the fourth aspect.

According to a sixth aspect, an embodiment of this application provides a communication apparatus, including a processor and a transceiver. Optionally, the apparatus may further include a memory. The memory is configured to store instructions, and the processor is configured to execute the instructions stored in the memory. When the processor executes the instructions stored in the memory, the processor is enabled to perform the method in any one of the first aspect to the fourth aspect or the possible implementations of the first aspect to the fourth aspect.

According to a seventh aspect, an embodiment of this application provides a computer-readable medium, configured to store a computer program. The computer program includes instructions used to perform the method in any one of the first aspect to the fourth aspect or the possible implementations of the first aspect to the fourth aspect.

According to an eighth aspect, an embodiment of this application further provides a computer program product including instructions. When the computer program product is run on a computer, the computer is enabled to perform the method in any one of the first aspect to the fourth aspect or the possible implementations of the first aspect to the fourth aspect.

According to a ninth aspect, a chip is provided, including a processor and a communication interface. The processor is configured to invoke instructions from the communication interface and run the instructions, and when the processor executes the instructions, the method in any one of the first aspect to the fourth aspect or the possible implementations of the first aspect to the fourth aspect is implemented.

Optionally, the chip may further include a memory. The memory stores the instructions. The processor is configured to execute the instructions stored in the memory or instructions from another module. When executing the instructions, the processor is configured to implement the method in any one of the first aspect to the fourth aspect or the possible implementations of the first aspect to the fourth aspect.

According to a tenth aspect, a communication system is provided. The communication system includes an apparatus with a function for implementing the method and possible designs in the first aspect, and an apparatus with a function for implementing the method and possible designs in the second aspect.

According to an eleventh aspect, a communication system is provided. The communication system includes an apparatus with a function for implementing the method and possible designs in the third aspect, and an apparatus with a function for implementing the method and possible designs in the fourth aspect.

DESCRIPTION OF EMBODIMENTS

The following describes technical solutions of this application with reference to the accompanying drawings.

The technical solutions in embodiments of this application are applicable to a communication system integrating terrestrial communication with satellite communication. The communication system may also be referred to as a non-terrestrial network (NTN) communication system. A terrestrial communication system may be, for example, a long term evolution (LTE) system, a universal mobile telecommunications system (UMTS), a 5G communication system or a new radio (NR) system, or a future next-generation mobile communication system.

Figure 1:
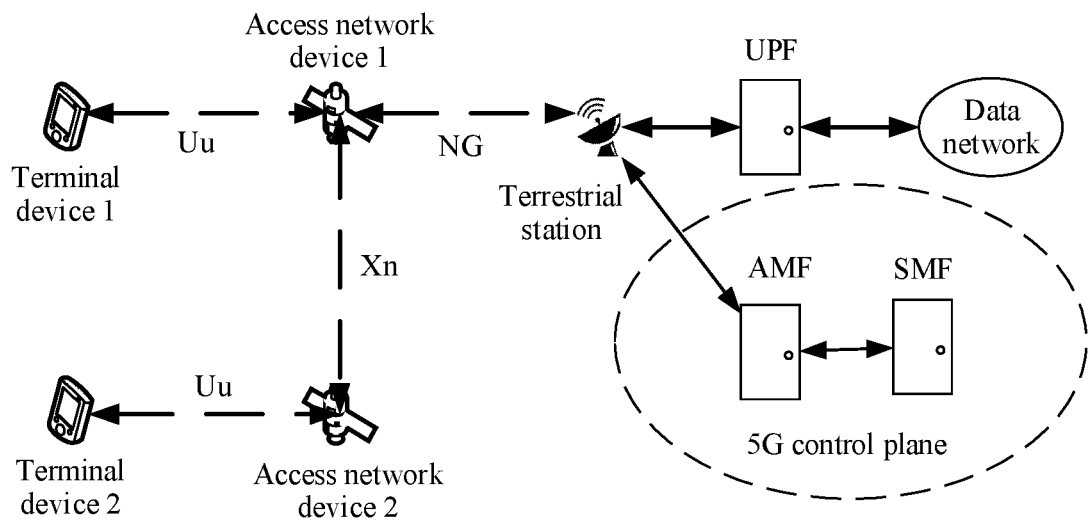
FIG. 1 is a schematic diagram of an NTN communication system according to an embodiment of this application.

FIG. 1 is a schematic diagram of an NTN communication system according to an embodiment of this application. In FIG. 1, an example in which the NTN communication system integrates 5G communication with satellite communication is used. As shown in FIG. 1, the communication system includes a terminal device 1, a terminal device 2, an access network device 1, an access network device 2, and a core network device.

The terminal device may access a network (for example, the access network device) through a 5G new radio interface (for example, a Uu interface), and the access network device may be connected to the core network device through a radio link (for example, an NG interface). For example, the NG interface may be configured to exchange service data of a user and signaling such as a non-access stratum (NAS) of the core network device. In addition, the radio link (for example, an Xn interface) between access network devices can be used to complete signaling exchange and user data transmission between the access network devices. For example, the Xn interface may be used to exchange signaling such as handover.

In FIG. 1, the terminal device may be a terrestrial mobile terminal device or a terrestrial fixed terminal device, the access network device may be deployed on a satellite or on the ground, and the core network device may be deployed on the ground. When the access network device is deployed on a satellite, the access network device may be used as a satellite network device.

Optionally, the communication system shown in FIG. 1 may further include a terrestrial station, configured to forward signaling and service data between the satellite network device and the core network device. For example, the terrestrial station may be connected to the satellite network device through a radio link (for example, an NG interface), and connected to an AMF or a UPF through a radio link or a wired link.

The terminal device in the embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device with a wireless connection function or a vehicle-mounted device. Currently, some terminals may be, for example, a mobile phone, a tablet, a laptop computer, a palmtop, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a terminal device in a future 5G network or a terminal device in an evolved public land mobile network (PLMN), and the like. This is not limited in this embodiment of this application.

The access network device in this embodiment of this application may be a device configured to communicate with the terminal device, and mainly provides a radio access service, schedules a radio resource for the terminal device, and provides a reliable wireless transmission protocol and data encryption protocol. The access network device may also be referred to as an access device or a radio access network device, and may be an evolved NodeB (eNodeB) in an LTE system, a radio controller in a cloud radio access network (CRAN) scenario, a relay station, an access point, a vehicle-mounted device, a wearable device, an access device in a future 5G network, a network device in a future evolved PLMN network, an access point (AP) in a WLAN, a gNB in a new radio (NR) system, or the like. This is not limited in this embodiment of this application.

In addition, in this embodiment of this application, the access network device is a device in a RAN, in other words, is a RAN node that connects the terminal device to a wireless network. For example, as an example instead of a limitation, the access network device may be a gNB, a transmission reception point (TRP), an eNB, a radio network controller (RNC), a NodeB (NB), a base station controller (BSC), a base transceiver station (BTS), a home NodeB (for example, a home evolved NodeB, or a home NodeB, HNB), a baseband unit (BBU), a wireless fidelity (Wi-Fi) access point (AP), or the like. In a network structure, the network device may include a centralized unit (CU) node or a distributed unit (DU) node, or may be a RAN device including a CU node and a DU node, or may be a RAN device including a control plane CU node (CU-CP node), a user plane CU node (CU-UP node), and a DU node.

In this embodiment of this application, the core network device may be connected to the access network device, and is used for services such as user access control, mobility association, session management, user security authentication, and charging. The core network device may include a plurality of functional units that may be classified into, for example, a control plane function entity and a data plane function entity. The control plane function entity includes, for example, an access management function (AMF) and a session management function (SMF). The data plane function entity includes, for example, a UPF and a data network.

The AMF is mainly responsible for access and mobility control, including registration management (RM) and connection management (CM), access authentication and access authorization, reachability management, mobility management, and the like.

The SMF is responsible for session management, including establishment, modification, release, and the like of a packet data unit (PDU) session.

The UPF mainly provides user plane support, including a connection point between a PDU session and a data network, routing and forwarding of a data packet, data packet detection and user plane policy execution, processing of quality of service (QoS) for a user plane, downlink data packet buffering, downlink data notification triggering, and the like.

For example, as shown in FIG. 1, the core network device may include, for example, a 5G control plane and a 5G data plane. The 5G control plane may include an AMF and an SMF, and the 5G data plane includes a UPF and a data network.

It should be understood that the communication system in FIG. 1 is merely an example for description, and a communication system applicable to this application is not limited thereto. For example, one access network device may serve a plurality of terminal devices, and one terminal device is only used as an example in FIG. 1. For another example, the core network side may further include another core network device, for example, an authentication server function (AUSF) or a packet control function (PCF).

To facilitate understanding of the embodiments of this application, the following briefly describes related terms in this application.

(1) Power Control

Power control means that when an indicator such as received signal strength or a signal-to-noise ratio at a receive end is evaluated, a transmit power is changed in due time to compensate for a path loss and fading on a radio channel. On one hand, power control can maintain communication quality without causing additional interference to another user on a same radio resource. On the other hand, power control reduces a transmit power of a transmitter, so that usage time of a battery can be prolonged.

Power control is divided into an open-loop manner and a closed-loop manner. Closed-loop power control is a process in which a transmit end controls a transmit power based on feedback information sent by the receive end. However, in the open-loop power control manner, feedback from the receive end is not needed, and the transmit end controls the transmit power based on information measured by the transmit end.

(2) Uplink (UL) Power Control

When sending a signal to a network device (for example, an access network device), a terminal device may perform uplink power control. For example, the terminal device may perform uplink power control on a physical uplink control channel (PUCCH), a physical uplink shared channel (PUSCH), a physical random access channel (PRACH) and a signal such as a sounding reference signal (SRS).

In the current NR protocol, uplink power control mainly includes an open-loop power control part, a closed-loop power control part, and another adjustment amount.

(3) Open-Loop Power Control

Open-loop power control is usually performed on a PRACH. For the PRACH, during random access, because a terminal device and a network device have not completed an uplink synchronization process, an indication of the network device cannot be obtained. In this case, the terminal device may obtain an uplink transmit power through calculation based on parameter setting, that is, perform open-loop power control.

In addition, a PUSCH carried in a message 3 (Msg 3) in a random access process is also sent in an open-loop power control manner.

(4) Closed-Loop Power Control

In addition to a PRACH, power control of another channel/signal may be performed in a closed-loop power control manner. For example, transmit power control (TPC) signaling in a physical downlink control channel (PDCCH) is used to perform closed-loop power control.

For a PUSCH, a PUCCH, and an SRS, a network device may calculate a power adjustment amount based on an uplink channel quality state, and send the power adjustment amount to a terminal device. The terminal device may obtain an uplink power through calculation based on the power adjustment amount.

In addition, to ensure that a power capability of the terminal device is matched, the terminal device configures a transmit power $P_{cmax}$ used to limit a maximum output power. Usually, a formula for calculating the uplink power P is as follows:

$$P = \min[P_{cmax}, \{\text{open-loop running point}\} + \{\text{closed-loop offset}\} + \{\text{another adjustment amount}\}]$$

During communication, a user needs to periodically report power headroom, namely, a difference between a current transmit power and a maximum transmit power.

(5) Uplink Transmit Powers of a PUSCH and a PUCCH

In the NR protocol, service transmission is scheduled by a network device. For example, the network device may send a control channel, for example, a PDCCH, and the control channel may carry scheduling information used to schedule a PDSCH, a PUSCH, or a PUCCH. The scheduling information includes resource allocation information, a modulation and coding scheme, and the like. This is not limited in this embodiment of this application. A terminal device detects the control channel in a subframe, and receives the PDSCH, sends the PUSCH, or sends the PUCCH based on the scheduling information carried in the detected control channel.

For example, the scheduling information may include downlink control information (DCI) used to indicate to send the PUSCH. The DCI may carry a TPC command field $\delta_{PUSCH}$ of the PUSCH. The scheduling information may also include DL DCI used to indicate to receive the PDSCH. The DL DCI may further carry a TPC command field $\delta_{PUCCH}$ of the PUCCH.

For example, the transmit power of the PUSCH may be shown in the following formula (1):

$$P_{PUSCH,f,c}(i, j, q_d, l) = \min\left\{ \begin{array}{c} P_{CMAX,f,c}(i) \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{array} \right\}; \quad (1)$$

the transmit power of the PUCCH may be shown in the following formula (2):

$$P_{PUCCH,b,f,c}(i, q_u, q_d, l) = \min\left\{ \begin{array}{c} P_{CMAX,f,c}(i) \\ P_{O\_PUCCH,b,f,c}(q_u) + 10\log_{10}(2^\mu \cdot M_{RB,b,f,c}^{PUCCH}(i)) + \\ \alpha_{f,c}(j) \cdot PL_{b,f,c}(q_d) + \Delta_{F\_PUCCH}(F) + \\ \Delta_{TF,b,f,c}(i) + g_{b,f,c}(i, l) \end{array} \right\}, \quad (2)$$

where
f indicates a carrier, c indicates a serving cell, i indicates a PUSCH transmission period, j indicates a configured parameter, and l indicates a power control adjustment state index;

$P_{CMAX,f,c}(i)$ indicates a maximum transmit power at which the terminal device is allowed to transmit on the carrier and the serving cell;

$P_{O\_PUSCH,f,c}(i)$ indicates an initial power of the PUSCH, and includes a cell-level higher-layer configuration parameter and a terminal device-level higher-layer configuration parameter;

$M_{RB,f,c}^{PUSCH}(i)$ indicates resource allocation bandwidth indication information of the PUSCH;

$\alpha_{f,c}(j) \leq 1$ indicates a path loss compensation factor;

$PL_{f,c}(q_d)$ indicates a path loss estimate;

$\Delta_{TF,f,c}(k) = 10\log_{10}((2^{BPRE \cdot K_s} - 1) \cdot \beta_{offset}^{PUSCH})$ indicates a modulation scheme offset, and is used to control a power for transmitting information on the PUSCH;

$f_{f,c}(i,l)$ indicates an adjustment parameter for closed-loop power control of the PUSCH, and is obtained through mapping TPC information in the PUSCH;

$P_{O\_PUCCH,b,f,c}(q_u)$ indicates an initial power of the PUCCH, and includes a cell-level higher-layer configuration parameter and a terminal device-level higher-layer configuration parameter;

$M_{RB,b,f,c}^{PUCCH}(i)$ indicates resource allocation bandwidth indication information of the PUCCH;

$\Delta_{F\_PUCCH}(F)$ indicates impact of different PUCCH transmission formats on the transmit power; and $g_{b,f,c}(i,l)$ indicates an adjustment amount of the transmit power of the PUCCH, and is obtained through mapping TPC information in the PDCCH.

It should be understood that the foregoing listed representation of power control in the NR protocol is merely an example, and shall not constitute any limitation on this application. This application does not exclude a possibility of defining another term in a future protocol to represent a same or similar meaning.

The foregoing manner of obtaining the uplink transmit power is applicable to power control of the terrestrial communication system. However, satellite communication differs widely from terrestrial communication. For example, heights of terrestrial network devices are the same. When the terminal device hands over to an adjacent network device, a difference between a path loss between the terminal device and a source network device and a path loss between the terminal device and a target network device is small. In this case, an uplink transmit power of the terminal device is constant.

However, in an NTN network, for example, the communication system in FIG. 1, a distance between the satellite network device and the terrestrial network device, or between satellite network devices, or between terrestrial network devices is large. Therefore, when the terminal device hands over between the satellite network device and the terrestrial network device, or hands over between satellite network devices, or hands over between terrestrial network devices, a distance between the source network device and the target network device is large. Consequently, the difference between the path loss between the terminal device and the source network device and the path loss between the terminal device and the target network device is large, for example, a jump occurs. In this case, power control of the terrestrial communication system is no longer applicable.

In view of this, the embodiments of this application provide a power control method and apparatus. When the terminal device hands over between the source network device and the target network device, and the path loss between the terminal device and the source network device is different from the path loss between the terminal device and the target network device, an uplink transmit power used when the terminal device communicates with the target network device can be controlled. The power control method and apparatus is applicable to the NTN network.

Figure 2:
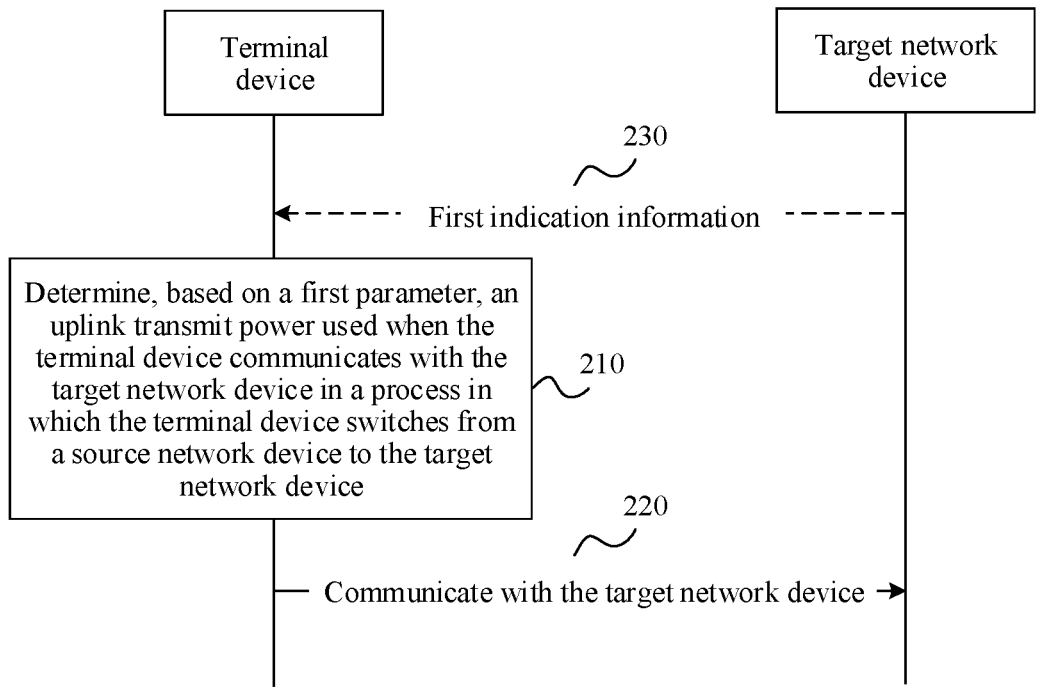
FIG. 2 is an interaction flowchart of a power control method according to an embodiment of this application.

The following describes the power control method in this embodiment of this application with reference to FIG. 2.

The technical solutions in this embodiment of this application may be applied to a wireless communication system, for example, the communication system shown in FIG. 1. There may be a wireless communication connection relationship between at least two communication apparatuses in the wireless communication system. For example, one of the at least two communication apparatuses may correspond to the access network device 1 shown in FIG. 1, for example, the access network device 1 or a chip configured in the access network device 1. For another example, one of the at least two communication apparatuses may correspond to the access network device 2 shown in FIG. 1, for example, the access network device 2 or a chip configured in the access network device 2. For example, the other of the at least two communication apparatuses may correspond to the terminal device 1 in FIG. 1, for example, the terminal device 1 or a chip configured in the terminal device 1. For example, the access network device 1 may be an example of the source network device, and the access network device 2 may be an example of the target network device.

Without loss of generality, the following first describes in detail this embodiment of this application by using a power control process of a terminal device as an example. It may be understood that any terminal device in the wireless communication system or a chip configured in the terminal device may perform power control based on the same method, and any network device in the wireless communication system or a chip configured in the network device may perform power control based on the same method. This is not limited in this application.

FIG. 2 is an interaction flowchart of a power control method 200 according to an embodiment of this application. As shown in FIG. 2, the power control method 200 includes step 210 to step 230.

210: A terminal device determines, based on a first parameter, an uplink transmit power used when the terminal device communicates with a target network device in a process in which the terminal device hands over from a source network device to the target network device. A path loss between the terminal device and the source network device is different from a path loss between the terminal device and the target network device. For example, the path loss between the terminal device and the target network device jumps relative to the path loss between the terminal device and the source network device.

The first parameter is used to adjust a first uplink transmit power used when the terminal device communicates with the source network device. In other words, the first uplink transmit power is adjusted based on the first parameter, to obtain an uplink transmit power (which is referred to as a second uplink transmit power in the following) used when the terminal device communicates with the target network device in the handover process.

For example, the second uplink transmit power may be an uplink transmit power used when the terminal device sends a data channel (for example, a PUSCH) to the target network device, an uplink transmit power used when the terminal device sends a control channel (for example, a PUCCH) to the target network device, or an uplink transmit power used when the terminal device sends a PARCH or an SRS to the target network device. This is not limited in this embodiment of this application.

Figure 3:
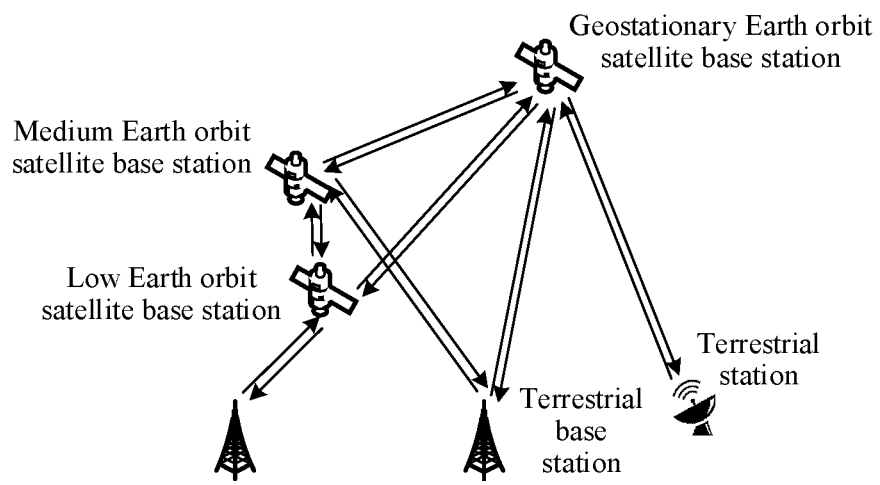
FIG. 3 is an example of communication between different network devices in an NTN network.

In this embodiment of this application, the source network device and the target network device may be two different network devices in an NTN network. FIG. 3 is an example of communication between different network devices in the NTN network. For example, a network device is a base station. The NTN network may include different types of base stations, for example, a terrestrial base station, a low Earth orbit (LEO) satellite base station, a medium Earth orbit satellite base station, and a geostationary Earth orbit (GEO) satellite base station. In some optional embodiments, the NTN network may further include a terrestrial station. The source network device in FIG. 2 may be a terrestrial base station, a low Earth orbit satellite base station, a medium Earth orbit satellite base station, a geostationary Earth orbit satellite base station, or a terrestrial station. The target network device may be a terrestrial base station, a low Earth orbit satellite base station, a medium Earth orbit satellite base station, a geostationary Earth orbit satellite base station, or a terrestrial station. This is not limited in this embodiment of this application.

For example, a height of a LEO is usually less than 2000 km. For example, the height of the LEO may be 600 km and is denoted as LEO (600 km), or the height of the LEO may be 1200 km and is denoted as LEO (1200 km). A height of a medium Earth orbit satellite usually ranges from 2000 km to 20000 km. A height of a GEO is usually greater than 20000 km. For example, the height of the GEO may be 35768 km and is denoted as GEO (35768 km).

For example, when the terminal device is a terrestrial terminal device, the source network device is a terrestrial base station, and the target network device is a satellite base station (for example, a low Earth orbit satellite base station, a medium Earth orbit satellite base station, or a geostationary Earth orbit satellite base station), when the source network device is a satellite base station, and the target network device is a terrestrial base station, when the source network device is a low Earth orbit satellite base station, and the target network device is a geostationary Earth orbit satellite base station, or when the source network device is a geostationary Earth orbit satellite base station, and the target network device is a low Earth orbit satellite base station, a distance between the source network device and the target network device is large. Consequently, the path loss between the terminal device and the source network device is different from the path loss between the terminal device and the target network device, for example, the path loss jumps.

In addition, when a satellite network device further needs to forward signaling or service data to the terrestrial station, the path loss between the terminal device and the network device includes a path loss between the satellite network device and the terminal device and a path loss between the satellite network device and the terrestrial station.

For example, when the terminal device communicates with the satellite network device, the satellite network device needs to forward signaling or service data to the terrestrial station for processing. In this case, if the terminal device does not hand over to another network device when communicating with the satellite network device, the satellite network device hands over a terrestrial station communicating with the satellite network device, that is, the satellite network device hands over from a source terrestrial station to a target terrestrial station, and a path loss between the satellite network device and the source terrestrial station is different from a path loss between the satellite network device and the target terrestrial station, the path loss between the terminal device and the source network device is still different from the path loss between the terminal device and the target network device.

In this embodiment of this application, because the path loss between the terminal device and the source network device is different from the path loss between the terminal device and the target network device, the terminal device cannot continue to communicate with the target network device at the first uplink transmit power between the terminal device and the source network device in the process in which the terminal device hands over from the source network device to the target network device.

For example, when the path loss between the terminal device and the target network device is greater than the path loss between the terminal device and the source network device, if the terminal device still communicates with the target network device at the first uplink transmit power, a path loss and fading on a radio channel may not be compensated, and communication quality between the terminal device and the target network device degrades.

For another example, when the path loss between the terminal device and the target network device is less than the path loss between the terminal device and the source network device, if the terminal device still communicates with the target network device at the first uplink transmit power, additional interference may be caused to another user on a same radio resource. In addition, a large transmit power shortens usage time of a battery of the terminal device.

In this embodiment of this application, the first uplink transmit power used when the terminal device communicates with the source network device is adjusted based on the first parameter, to obtain the second uplink transmit power used when the terminal device communicates with the target network device. In other words, in this embodiment of this application, an adjusted first uplink transmit power (namely, the second uplink transmit power) can be used to communicate with the target network device.

In some embodiments, the first parameter includes a first compensation value (which may be denoted as $\Delta P_{HO}$) of the first uplink transmit power between the terminal device and the source network device and/or a second compensation value (which may be denoted as N) of a path loss factor (which may be denoted as $\alpha_1$) corresponding to the first uplink transmit power.

In some possible description, because the first compensation value is compensated to the first uplink transmit power, the first compensation value may also be referred to as a power compensation value. Because the second compensation value is compensated to the path loss factor corresponding to the first uplink transmit power, the second compensation value may also be referred to as a path loss factor compensation value.

For example, when the first parameter is $\Delta P_{HO}$, the second uplink transmit power may be a sum of the first uplink transmit power and $\Delta P_{HO}$. In other words, the second uplink transmit power may be obtained by adding $\Delta P_{HO}$ to the first uplink transmit power used when the terminal device communicates with the source network device.

For example, an uplink transmit power used when the terminal device sends the PUSCH to the target network device is the second uplink transmit power. When an uplink transmit power used when the terminal device sends the PUSCH to the source network device is the foregoing formula (1), the uplink transmit power used when the terminal device sends the PUSCH to the target network device may be shown as the following formula (3):

$$P_{PUSCH,f,c}(i, j, q_d, l) = \min\left\{ \begin{array}{c} P_{O\_PUSCH,f,c}(j) + 10\log_{10}(2^{\mu} \cdot M_{RB,f,c}^{PUSCH}(i)) + \\ \alpha_{f,c}(j) \cdot PL_{f,c}(q_d) + \Delta_{TF,f,c}(i) + \\ \Delta P_{HO} + f_{f,c}(i, l) \end{array} \right\} \quad (3)$$

For example, an uplink transmit power used when the terminal device sends the PUCCH to the target network device is the second uplink transmit power. When an uplink transmit power used when the terminal device sends the PUCCH to the source network device is the foregoing formula (2), the uplink transmit power used when the terminal device sends the PUCCH to the target network device may be shown as the following formula (4):

$$P_{PUCCH,b,f,c}(i, q_u, q_d, l) = \min\left\{\begin{array}{l} P_{CMAX,f,c}(i) \\ P_{O\_PUCCH,b,f,c}(q_u) + 10\log_{10}(2^\mu \cdot M_{RB,b,f,c}^{PUCCH}(i)) + \\ \alpha_{f,c}(j) \cdot PL_{b,f,c}(q_d) + \Delta_{F\_PUCCH}(F) + \\ \Delta_{TF,b,f,c}(i) + \Delta P_{HO} + g_{b,f,c}(i, l) \end{array}\right\} \quad (4)$$

In this embodiment of this application, a value of $\Delta P_{HO}$ may be a positive number, a negative number, or 0. This is not limited in this embodiment of this application.

For another example, when the first parameter is N, a path loss factor (which may be denoted as $\alpha_2$) corresponding to the second uplink transmit power may be a sum, namely, ($\alpha_1$+N), or a product, namely, ($\alpha_1 \times N$, $\alpha_1 \cdot N$, or $\alpha_1 N$), of N and the path loss factor $\alpha_1$ corresponding to the first uplink transmit power. In other words, the path loss factor $\alpha_2$ corresponding to the second uplink transmit power may be obtained by multiplying N and the path loss factor $\alpha_1$ corresponding to the first uplink transmit power or adding N to the path loss factor $\alpha_1$ corresponding to the first uplink transmit power used when the terminal device communicates with the source network device.

Then, the second uplink transmit power may be determined based on the path loss factor $\alpha_2$ corresponding to the second uplink transmit power. For example, $\alpha_2$ may be used to replace the path loss factor $\alpha_1$ in the formula (for example, the foregoing formula (1) or the formula (2)), corresponding to the first uplink transmit power used when the terminal device communicates with the source network device, to obtain the second uplink transmit power.

For example, an uplink transmit power used when the terminal device sends the PUSCH to the target network device is the second uplink transmit power. When an uplink transmit power used when the terminal device sends the PUSCH to the source network device is the foregoing formula (1), the uplink transmit power used when the terminal device sends the PUSCH to the target network device may be shown as the following formula (5) or the formula (6):

$$P_{PUSCH,f,c}(i, j, q_d, l) = \min\left\{\begin{array}{l} P_{CMAX,f,c}(i) \\ P_{O\_PUSCH,f,c}(j) + 10\log_{10}(2^\mu \cdot M_{RB,f,c}^{PUSCH}(i)) + \\ (N + \alpha_{f,c}(j)) \cdot PL_{f,c}(q_d) + \Delta_{TF,f,c}(i) f_{f,c}(i, l) \end{array}\right\} \quad (5)$$

$$P_{PUSCH,f,c}(i, j, q_d, l) = \min\left\{\begin{array}{l} P_{CMAX,f,c}(i) \\ P_{O\_PUSCH,f,c}(j) + 10\log_{10}(2^\mu \cdot M_{RB,f,c}^{PUSCH}(i)) + \\ N \cdot \alpha_{f,c}(j) \cdot PL_{f,c}(q_d) + \Delta_{TF,f,c}(i) + f_{f,c}(i, l) \end{array}\right\} \quad (6)$$

For example, an uplink transmit power used when the terminal device sends the PUCCH to the target network device is the second uplink transmit power. When an uplink transmit power used when the terminal device sends the PUCCH to the source network device is the foregoing formula (2), the uplink transmit power used when the terminal device sends the PUCCH to the target network device may be shown as the following formula (7) or the formula (8):

$$P_{PUCCH,b,f,c}(i, q_u, q_d, l) = \min\left\{\begin{array}{l} P_{CMAX,f,c}(i) \\ P_{O\_PUCCH,b,f,c}(q_u) + 10\log_{10}(2^\mu \cdot M_{RB,b,f,c}^{PUCCH}(i)) + \\ (N + \alpha_{f,c}(j)) \cdot PL_{b,f,c}(q_d) + \Delta_{F\_PUCCH}(F) + \Delta_{TF,b,f,c}(i) + g_{b,f,c}(i, l) \end{array}\right\} \quad (7)$$

$$P_{PUCCH,b,f,c}(i, q_u, q_d, l) = \min\left\{\begin{array}{l} P_{CMAX,f,c}(i) \\ P_{O\_PUCCH,b,f,c}(q_u) + 10\log_{10}(2^\mu \cdot M_{RB,b,f,c}^{PUCCH}(i)) + \\ (N \cdot \alpha_{f,c}(j)) \cdot PL_{b,f,c}(q_d) + \Delta_{F\_PUCCH}(F) + \Delta_{TF,b,f,c}(i) + g_{b,f,c}(i, l) \end{array}\right\} \quad (8)$$

In this embodiment of this application, when the path loss factor corresponding to the second uplink transmit power is the sum of N and the path loss factor corresponding to the first uplink transmit power, for example, in the formula (5) and the formula (7), a value of N may be a positive number, a negative number, or 0. When the path loss factor corresponding to the second uplink transmit power is the product of N and the path loss factor corresponding to the first uplink transmit power, for example, in the formula (6) and the formula (8), a value of N may be a positive number or a negative number.

It can be learned from the foregoing that the uplink transmit power of the terminal device can be changed from the first uplink transmit power to the second uplink transmit power based on the first parameter. It may be understood that the power change is generated in response to a change in a communication distance (namely, a path loss) between the terminal device and the network device. In addition, the change in the communication distance (or the path loss) between the terminal device and the network device further causes a change in a communication delay between the terminal device and the network device.

Based on the foregoing description, in some optional embodiments, the first parameter may be determined based on a delay parameter and/or a distance parameter between the terminal device and the source network device, and a delay parameter and/or a distance parameter between the terminal device and the target network device.

In an implementation of this application, a height of a network device is related to a distance between the terminal device and the network device, for example, as the height of the network device increases, the distance between the terminal device and the network device increases. Therefore, the first parameter may be determined based on a distance between the terminal device and the source network device, and a distance between the terminal device and the target network device. In some optional embodiments, when network devices are classified by height, the first parameter may be determined based on a type of the source network device and a type of the target network device.

For example, the first parameter is the power compensation value $\Delta P_{HO}$. Different types of source network devices and target network devices correspond to different power compensation values $\Delta P_{HO}$. Table 1 is an example of different types of network devices and corresponding values $\Delta P_{HO}$.

TABLE 1

| Type of a first network device | Type of a second network device | Value of $\Delta P_{HO}$ |
|---|---|---|
| Terrestrial network device | LEO (600 km) | ±15 dB |
| Terrestrial network device | LEO (1200 km) | ±20 B |
| Terrestrial network device | GEO | ±20 B |
| LEO (600 km) | LEO (1200 km) | ±5 dB |
| LEO (600 km) | GEO | ±20 dB |
| LEO (1200 km) | GEO | ±15 dB |

When the first network device is the source network device, and the second network device is the target network device, a value of $\Delta P_{HO}$ is positive, that is, $\Delta P_{HO}$ is "+" in a column in which $\Delta P_{HO}$ is located. For example, when the terminal device hands over from the terrestrial network device to the LEO (600 km) network device, the value of $\Delta P_{HO}$ is +15 dB, that is, positive compensation is performed on the first uplink transmit power.

Therefore, in this embodiment of this application, when the path loss between the terminal device and the target network device is greater than the path loss between the terminal device and the source network device, positive power compensation is performed on the first uplink transmit power, so that the second uplink transmit power is greater than the first uplink transmit power. Therefore, uplink transmit powers that meet communication between the terminal device and the target network device can be obtained in different handover scenarios.

When the first network device is the target network device, and the second network device is the source network device, a value of $\Delta P_{HO}$ is negative, that is, $\Delta P_{HO}$ is "−" in a column in which $\Delta P_{HO}$ is located. For example, when the terminal device hands over from the LEO (600 km) network device to the terrestrial network device, the value of $\Delta P_{HO}$ is −15 dB, that is, negative compensation is performed on the first uplink transmit power.

Therefore, in this embodiment of this application, when the path loss between the terminal device and the target network device is less than the path loss between the terminal device and the source network device, negative power compensation is performed on the first uplink transmit power, so that the second uplink transmit power is less than the first uplink transmit power. Therefore, uplink transmit powers that meet communication between the terminal device and the target network device can be obtained in different handover scenarios.

For example, the first parameter is the path loss factor compensation value N. Different types of source network devices and target network devices correspond to different path loss factor compensation values N.

Table 2 is an example of different types of network devices and corresponding path loss factor compensation values $N_1$. The path loss factor corresponding to the second uplink transmit power is a product of $N_1$ and the path loss factor corresponding to the first uplink transmit power.

TABLE 2

| Type of a first network device | Type of a second network device | Value of $N_1$ |
|---|---|---|
| Terrestrial network device | LEO (600 km) | 4 (¼) |
| Terrestrial network device | LEO (1200 km) | 7 (1/7) |
| Terrestrial network device | GEO | 10 (1/10) |
| LEO (600 km) | LEO (1200 km) | 3 (⅓) |
| LEO (600 km) | GEO | 17 (1/17) |
| LEO (1200 km) | GEO | 15 (1/15) |

When the first network device is the source network device, and the second network device is the target network device, the value of $N_1$ is greater than 1, that is, the value of $N_1$ is a number outside the brackets in a column in which $N_1$ is located. For example, when the terminal device hands over from the terrestrial network device to the LEO (600 km) network device, the value of $N_1$ is 4, that is, the path loss factor corresponding to the first uplink transmit power is expanded.

Therefore, in this embodiment of this application, when the path loss between the terminal device and the target network device is greater than the path loss between the terminal device and the source network device, the path loss factor corresponding to the first uplink transmit power is expanded, so that the second uplink transmit power is greater than the first uplink transmit power. Therefore, uplink transmit powers that meet communication between the terminal device and the target network device can be obtained in different handover scenarios.

When the first network device is the target network device, and the second network device is the source network device, the value of $N_1$ is less than 1, that is, the value of $N_1$ is a number inside the brackets in a column in which $N_1$ is located. For example, when the terminal device hands over from the terrestrial network device to the LEO (600 km) network device, the value of $N_1$ is ¼, that is, the path loss factor corresponding to the first uplink transmit power is scaled down.

Therefore, in this embodiment of this application, when the path loss between the terminal device and the target network device is less than the path loss between the terminal device and the source network device, the path loss factor corresponding to the first uplink transmit power is scaled down, so that the second uplink transmit power is less than the first uplink transmit power. Therefore, uplink transmit powers that meet communication between the terminal device and the target network device can be obtained in different handover scenarios.

Table 3 is an example of different types of network devices and corresponding path loss factor compensation values $N_2$. The path loss factor corresponding to the second uplink transmit power is a sum of $N_2$ and the path loss factor corresponding to the first uplink transmit power.

TABLE 3

| Type of a first network device | Type of a second network device | Value of $N_2$ |
|---|---|---|
| Terrestrial network device | LEO (600 km) | ±4 |
| Terrestrial network device | LEO (1200 km) | ±7 |
| Terrestrial network device | GEO | ±10 |
| LEO (600 km) | LEO (1200 km) | ±3 |
| LEO (600 km) | GEO | ±17 |
| LEO (1200 km) | GEO | ±15 |

When the first network device is the source network device, and the second network device is the target network device, the value of $N_2$ is positive, that is, $N_2$ is "+" in a column in which $N_2$ is located. For example, when the terminal device hands over from the terrestrial network device to the LEO (600 km) network device, the value of $N_2$ is +4, that is, positive compensation is performed on the path loss factor corresponding to the first uplink transmit power.

Therefore, in this embodiment of this application, when the path loss between the terminal device and the target network device is greater than the path loss between the terminal device and the source network device, positive compensation is performed on the path loss factor corresponding to the first uplink transmit power, so that the second uplink transmit power is greater than the first uplink transmit power. Therefore, uplink transmit powers that meet communication between the terminal device and the target network device can be obtained in different handover scenarios.

When the first network device is the target network device, and the second network device is the source network device, the value of $N_2$ is negative, that is, $N_2$ is "−" in a column in which $N_2$ is located. For example, when the terminal device hands over from the terrestrial network device to the LEO (600 km) network device, the value of $N_2$ is −4, that is, negative compensation is performed on the path loss factor corresponding to the first uplink transmit power.

Therefore, in this embodiment of this application, when the path loss between the terminal device and the target network device is less than the path loss between the terminal device and the source network device, negative compensation is performed on the path loss factor corresponding to the first uplink transmit power, so that the second uplink transmit power is less than the first uplink transmit power. Therefore, uplink transmit powers that meet communication between the terminal device and the target network device can be obtained in different handover scenarios.

It can be learned from Table 2 and Table 3, a compensated path loss factor corresponding to the first uplink transmit power (namely, the path loss factor corresponding to the second uplink transmit power) may be a real number less than or equal to 1 or greater than 1, which falls within the protection scope of the embodiments of this application.

Because the satellite network device has a specific height, in a process of communicating with the satellite network device, a terminal device in an area (for example, a cell or a beam) has a common delay (common TA) related to the height. In some embodiments, the terminal device may obtain or store the common delay in advance. In some possible implementations, the network device may notify the terminal device of the common delay through broadcasting or in another manner. In some possible implementations, the terminal device may alternatively obtain the common delay based on positioning information, ephemeris information, and the like.

In another implementation of this application, the terminal device may determine the first parameter based on a common delay difference (which may be represented as $\Delta TA_{common}$) between the terminal device and the source network device and the target network device. The common delay difference is a difference between a common delay between the terminal device and the source network device and a common delay between the terminal device and the target network device. Table 4 is an example of the common delay difference and a corresponding value of $\Delta P_{HO}$.

TABLE 4

| Common delay difference | $\Delta P_{HO}$ |
|---|---|
| $\Delta TA_{common\_1}$ | $\Delta P_{HO\_1}$ |
| $\Delta TA_{common\_2}$ | $\Delta P_{HO\_2}$ |
| $\Delta TA_{common\_3}$ | $\Delta P_{HO\_3}$ |
| ... | ... |
| $\Delta TA_{common\_m}$ | $\Delta P_{HO\_m}$ |

It can be learned from Table 4 that different common delay differences may correspond to different values of $\Delta P_{HO}$. It may be understood that in some optional embodiments, different common delay differences may alternatively correspond to different values of N.

A power compensation value $\Delta P_{HO}$ corresponding to the common delay difference may be obtained by querying the table, and may also be determined based on the common delay difference in an online calculation manner.

For example, the power compensation value $\Delta P_{HO}$ may be determined according to the following formula (9) and the formula (10):

$$\Delta L = \Delta TA_{common}/(2*c) \tag{9}$$

$$\Delta P_{HO} = \Delta loss = 20*\log10((L1 + \Delta L)/L1) \tag{10}$$

$\Delta L$ indicates a common distance difference between the terminal device and the source network device and the target network device, namely, a difference between a distance between the terminal device and the source network device and a distance between the terminal device and the target network device, c indicates the speed of light, L1 indicates a communication distance between the terminal device and the source network device, L1+$\Delta L$ indicates a communication distance between the terminal device and the target network device, and $\Delta loss$ indicates a path loss generated after the source network device is handed over to the target network device. A value of $\Delta P_{HO}$ may be equal to a value of $\Delta loss$, to implement compensation on the first uplink transmit power.

It should be noted that in addition to a manner of determining the power compensation value based on the common delay difference, the terminal device may further determine, based on the distance parameter, the power compensation value $\Delta P_{HO}$ by obtaining the distance parameter of the source network device or the distance parameter of the target network device. For example, the network device may notify the terminal device of the distance parameter through broadcasting or in another manner.

In some optional embodiments of this application, the second uplink transmit power is less than or equal to a maximum uplink transmit power of the terminal device.

In an implementation, when an uplink transmit power that is used when the terminal device communicates with the target network device and that is obtained through calculation according to the foregoing table or the foregoing formula is greater than the maximum uplink transmit power of the terminal device, the second uplink transmit power used when the terminal device actually communicates with the target network device may be the maximum uplink transmit power of the terminal device.

For example, when the first uplink transmit power is represented as P1, and the second uplink transmit power is represented as P1+$\Delta P_{HO}$, P1+$\Delta P_{HO}$ meets the following formula (11):

$$P1 + \Delta P_{HO} \le P_{CMAX} \tag{11}$$

$P_{CMAX}$ indicates the maximum uplink transmit power of the terminal device.

In another implementation, when the path loss between the terminal device and the source network device is different from the path loss between the terminal device and the target network device, and the terminal device hands over from the source network device to the target network device, the terminal device communicates with the target network device at the maximum uplink transmit power.

For example, in the handover process, the uplink transmit power used when the terminal device sends the PUSCH to the target network device may be shown as the following formula (12):

$$P_{PUSCH,f,c}(i) = P_{CMAX,f,c}(i) \quad (12)$$

In the handover process, the uplink transmit power used when the terminal device sends the PUCCH to the target network device may be shown as the following formula (13):

$$P_{PUCCH,b,f,c}(i) = P_{CMAX,f,c}(i) \quad (13)$$

In this way, the terminal device may not need to obtain, through complex calculation, the uplink transmit power used when the terminal device communicates with the target network device. This can reduce complexity of the terminal device. In addition, when the terminal device communicates with the network device at the maximum uplink transmit power, the terminal device may not need to report power headroom to the network device. This can reduce signaling overheads.

In addition, when the terminal device is not in the process of handing over from the source network device to the target network device, for example, before or after the handover process, the terminal device may determine the uplink transmit power in an existing power control manner, for example, according to the formula (1) or the formula (2).

In this embodiment of this application, the second uplink transmit power may be determined in an open-loop power control manner or a closed-loop power control manner.

In an implementation, when the open-loop power control manner is used, the terminal device may determine the first parameter based on the delay parameter and/or the distance parameter between the terminal device and the source network device, and the delay parameter and/or the distance parameter between the terminal device and the target network device.

For example, the terminal device may obtain the power compensation value $\Delta P_{HO}$ or the path loss factor compensation value N by querying the table based on the type of the source network device and the type of the target network device, or based on the common delay difference. In some possible implementations, when accessing a network device, the terminal device may identify a type of the network device based on a related parameter such as a delay or a distance. In addition, the terminal device may obtain or store the foregoing Table 1 to Table 4 in advance, to determine the second uplink transmit power by querying tables.

In another implementation, when the closed-loop power control manner is used, the target network device may determine the first parameter based on the delay parameter and/or the distance parameter between the terminal device and the source network device, and the delay parameter and/or the distance parameter between the terminal device and the target network device. For example, the target network device may obtain or store the foregoing Table 1 to Table 4 in advance, to determine the second uplink transmit power by querying tables.

Then, optionally, the method 200 further includes step 230, that is, the target network device may send first indication information to the terminal device, where the first indication information is used to indicate the first parameter. In this way, the terminal device may determine the first parameter based on the first indication information. For example, the first indication information may include the first parameter.

For example, the target network device may send the first indication information to the source network device through an Xn interface, and then the source network device sends the first indication information to the terminal device through a 5G new radio interface between the terminal device and the source network device.

In a possible implementation, the first indication information may be carried in RRC signaling, for example, an RRC reconfiguration message. For example, the RRC reconfiguration message may include the power compensation value $\Delta P_{HO}$ or the path loss factor compensation value N.

For example, a power compensation field may be added to an information element (IE) field of the RRC reconfiguration message, to indicated power compensation value $\Delta P_{Ho}$. The following shows an example of the power compensation field in an 1E structure of the RRC reconfiguration message in this embodiment of this application.

PowerCompensation ENUMERATED {−20 dB, −10 dB, 0 dB, 10 dB, 20 dB}

220: The terminal device communicates with the target network device.

Specifically, the terminal device communicates with the target network device at the second uplink transmit power in the process in which the terminal device hands over from the source network device to the target network device.

For example, when the second uplink transmit power is the uplink transmit power used when the terminal device sends the PUSCH to the target network device, the terminal device may send the PUSCH to the target network device at the second uplink transmit power. When the second uplink transmit power is the uplink transmit power used when the terminal device sends the PUCCH to the target network device, the terminal device may send the PUCCH to the target network device at the second uplink transmit power. When the second uplink transmit power is the uplink transmit power used when the terminal device sends the PARCH to the target network device, the terminal device may send the PARCH to the target network device at the second uplink transmit power. When the second uplink transmit power is the uplink transmit power used when the terminal device sends the SRS to the target network device, the terminal device may send the SRS to the target network device at the second uplink transmit power. However, this embodiment of this application is not limited thereto.

Therefore, in this embodiment of this application, the first uplink transmit power used when the terminal device communicates with the source network device is adjusted based on the first parameter, to obtain the second uplink transmit power, and the second uplink transmit power is used to communicate with the target network device in the handover process. Based on the foregoing description, in this embodiment of this application, when the path loss between the terminal device and the source network device is different from the path loss between the terminal device and the target network device, an uplink power used when the terminal device communicates with the target network device can be controlled in the handover process of the terminal device.

For example, when the path loss between the terminal device and the target network device is greater than the path loss between the terminal device and the source network device, positive power compensation may be performed on the first uplink transmit power, so that the second uplink transmit power is greater than the first uplink transmit power. Therefore, the second uplink transmit power can compensate for the path loss and the fading on the radio channel. This improves communication quality between the terminal device and the target network device.

For another example, when the path loss between the terminal device and the target network device is less than the path loss between the terminal device and the source network device, negative power compensation may be performed on the first uplink transmit power, so that the second uplink transmit power is less than the first uplink transmit power. This reduces extra interference to another user on a same radio resource. In addition, usage time of a battery of the terminal device can be further prolonged by reducing the uplink transmit power of the terminal device.

In addition, for a system architecture integrating a terrestrial communication system with a satellite communication system, when a terminal device communicates with a satellite network device, a height of the satellite network device is high, and a distance between the satellite network device and the terminal device is large. Consequently, a path loss between the terminal device and a network device is large. In addition, a transmit power of a terrestrial terminal device is small. When a path loss between the terminal device and the network device is large, the terminal device may perform uplink transmission with the network device at a maximum transmit power. In this case, how to perform uplink power control is a problem that urgently needs to be resolved.

In view of this, an embodiment of this application further provides a power control method and apparatus. An uplink transmit power used when a terminal device communicates with a network device can be determined based on a transmit power of the terminal device and/or a path loss between the terminal device and the network device.

Figure 4:
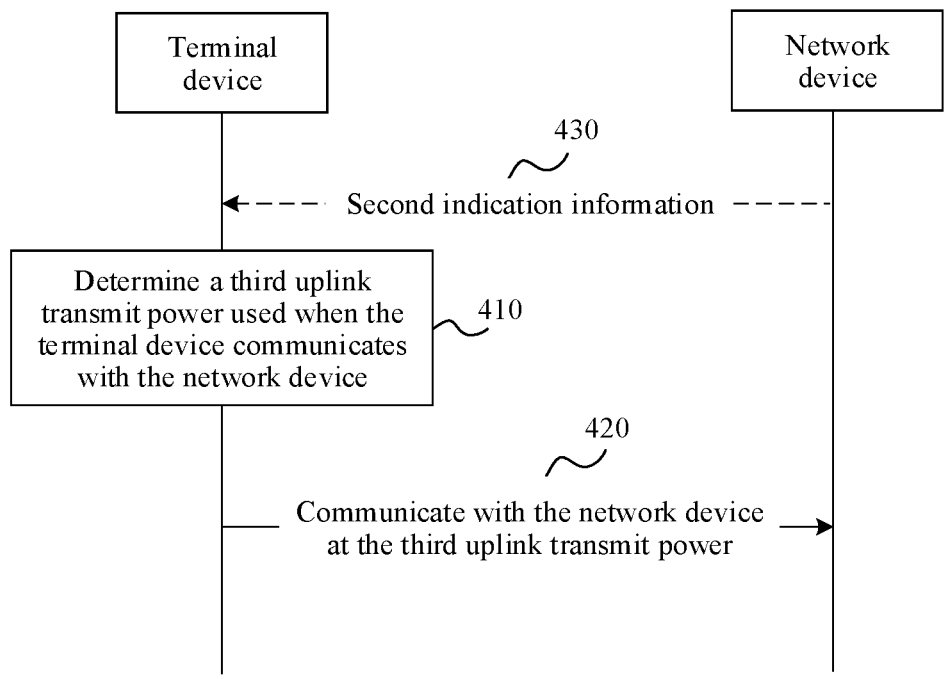
FIG. 4 is an interaction flowchart of a power control method according to an embodiment of this application.

The following describes the power control method in this embodiment of this application with reference to FIG. 4.

The technical solutions in this embodiment of this application may be applied to a wireless communication system, for example, the communication system shown in FIG. 1. There may be a wireless communication connection relationship between at least two communication apparatuses in the wireless communication system. For example, one of the at least two communication apparatuses may correspond to the access network device 1 shown in FIG. 1, for example, the access network device 1 or a chip configured in the access network device 1. For example, the other of the at least two communication apparatuses may correspond to the terminal device 1 in FIG. 1, for example, the terminal device 1 or a chip configured in the terminal device 1. For another example, one of the at least two communication apparatuses may correspond to the access network device 2 shown in FIG. 1, for example, the access network device 2 or a chip configured in the access network device 2. For example, the other of the at least two communication apparatuses may correspond to the terminal device 2 in FIG. 1, for example, the terminal device 2 or a chip configured in the terminal device 2.

Without loss of generality, the following first describes in detail this embodiment of this application by using a power control process of a terminal device as an example. It may be understood that any terminal device in the wireless communication system or a chip configured in the terminal device may perform power control based on the same method, and any network device in the wireless communication system or a chip configured in the network device may perform power control based on the same method. This is not limited in this application.

FIG. 4 is an interaction flowchart of a power control method 400 according to an embodiment of this application. As shown in FIG. 4, the power control method 400 includes step 410 to step 430.

410: A terminal device determines a third uplink transmit power used when the terminal device communicates with a network device.

In some embodiments, the terminal device may determine, based on a transmit power of the terminal device and/or a path loss between the terminal device and the network device, an uplink transmit power, used when the terminal device communicates with the network device. For example, the uplink transmit power may be referred to as the third uplink transmit power.

In some embodiments, before step 410, the method 400 may further include step 430: The terminal device receives second indication information sent by the network device, where the second indication information is used to indicate the third uplink transmit power. In this case, the third uplink transmit power may be determined by the network device based on the transmit power of the terminal device and/or the path loss between the terminal device and the network device.

It may be understood that a communication distance or a communication delay between the terminal device and the network device is related to the path loss of the terminal device. In other words, different path losses correspond to different communication distances or communication delays. Therefore, in some possible implementations, the third uplink transmit power may further be determined based on a distance parameter and/or a delay parameter between the terminal device and the network device.

In addition, when network devices are classified by height, the third uplink transmit power may further be determined based on a type of the network device. For example, the network devices may be classified into a LEO network device, a low Earth orbit satellite network device, and a GEO network device.

Optionally, in this embodiment of this application, the third uplink transmit power may be a maximum uplink transmit power of the terminal device, or an uplink transmit power determined in a pre-configured uplink power control manner. For example, the pre-configured uplink power control manner is an uplink power control manner defined in an NR protocol, or an uplink transmit power manner determined according to the foregoing formula (1) or the formula (2).

For example, for a handheld terminal device and the GEO network device, a transmit power of the terminal device is small, and a distance between the terminal device and the GEO network device is large. Consequently, a path loss is large. In this case, if the uplink transmit power is determined according to the foregoing formula (1) or the formula (2), an uplink transmit power obtained through calculation may be close to or greater than a maximum uplink transmit power $P_{CMAX,f,c}(i)$ of the terminal device. Therefore, in this case, to reduce complexity of the terminal device, the uplink transmit power may not need to be calculated, and communication with the network device is directly performed at the maximum uplink transmit power. In addition, when the terminal device communicates with the network device at the maximum uplink transmit power, the terminal device may not need to report power headroom to the network device. This can reduce signaling overheads.

For another example, for a VSAT terminal device and a LEO (600 km) network device, a transmit power of the terminal device is large, and a distance between the terminal device and the LEO (600 km) network device is small. In this case, an uplink transmit power obtained through calculation according to the foregoing formula (1) or the formula (2) may be less than a maximum uplink transmit power $P_{CMAX,f,c}(i)$ of the terminal device. Therefore, in this case, the uplink transmit power may still be determined in the pre-configured uplink power control manner.

In some possible implementations, terminal devices may be classified based on a transmit power of the terminal device. For example, the terminal device may be classified into a handheld terminal device, a very small aperture terminal (VSAT) device, another terminal device, and the like. A transmit power of another terminal device is greater than the transmit power of the VSAT terminal device, and the transmit power of the VSAT terminal device is greater than a transmit power of the handheld terminal device.

When the terminal devices are classified by transmit power, and the network devices are classified by height, the third uplink transmit power may be determined based on a type of the terminal device and the type of the network device. Table 5 shows an example of a correspondence between the type of the terminal device, the type of the network device, and the third uplink transmit power.

TABLE 5

| Type of a terminal device | Type of a network device | Third uplink transmit power | Power headroom report (headroom report) |
| --- | --- | --- | --- |
| Handheld terminal device | GEO | $P_{max}$ | Disable |
|  | LEO (600 km) | Power control | Enable |
|  | LEO (1200 km) | $P_{max}$ | Disable |
| VSAT | GEO | $P_{max}$ | Disable |
|  | LEO (600 km) | Power control | Enable |
|  | LEO (1200 km) | Power control | Enable |
| Another terminal device | GEO | $P_{max}$ | Disable |
|  | LEO (600 km) | Power control | Enable |
|  | LEO (1200 km) | Power control | Enable |

In Table 5, $P_{max}$ indicates communication at a maximum transmit power, and power control indicates that the third uplink transmit power is determined in a power control manner preset in a protocol. For example, the third uplink transmit power is determined according to the foregoing formula (1) or the formula (2).

Optionally, whether the power headroom report needs to be performed may further be defined in Table 5. Disable in a column in which the headroom report is located indicates that the power headroom report does not need to be performed, and enable in the column in which the headroom report is located indicates that the power headroom report needs to be performed.

In this embodiment of this application, the third uplink transmit power may be determined in an open-loop power control manner or a closed-loop power control manner.

In an implementation, when the open-loop power control manner is used, the terminal device may determine the third uplink transmit power based on the transmit power of the terminal device and/or the path loss between the terminal device and the network device. In some possible implementations, when accessing the network device, the terminal device may identify the type of the network device based on a related parameter such as a delay or a distance. In addition, the terminal device may obtain or store the foregoing Table 5 in advance, to determine the third uplink transmit power by querying the table.

In an implementation, when the closed-loop power control manner is used, the network device may determine the third uplink transmit power based on the transmit power of the terminal device and/or the path loss between the terminal device and the network device. For example, the network device may obtain or store the foregoing Table 5 in advance, to determine the second uplink transmit power by querying the table.

Then, optionally, before step 410, the method 400 may further include step 430, that is, the network device may send the second indication information to the terminal device, where the second indication information is used to indicate the third uplink transmit power. In this way, the terminal device may determine the third uplink transmit power based on the second indication information.

For example, the second indication information may be carried in RRC signaling or PUCCH scheduling information (for example, DCI). This is not limited in this embodiment of this application.

In a possible implementation, the second indication information may indicate whether the third uplink transmit power is the maximum uplink transmit power. For example, when the second indication information is an indication bit, and the indication bit is "1", it indicates that the third uplink transmit power is the maximum uplink transmit power; when the indication bit is "0", it indicates that the third uplink transmit power is determined in the pre-configured manner; or vice versa, i.e., when the second indication information is an indication bit, and the indication bit is "0", it indicates that the third uplink transmit power is the maximum uplink transmit power; when the indication bit is "1", it indicates that the third uplink transmit power is determined in the pre-configured manner. This is not limited in this embodiment of this application.

Figure 5:
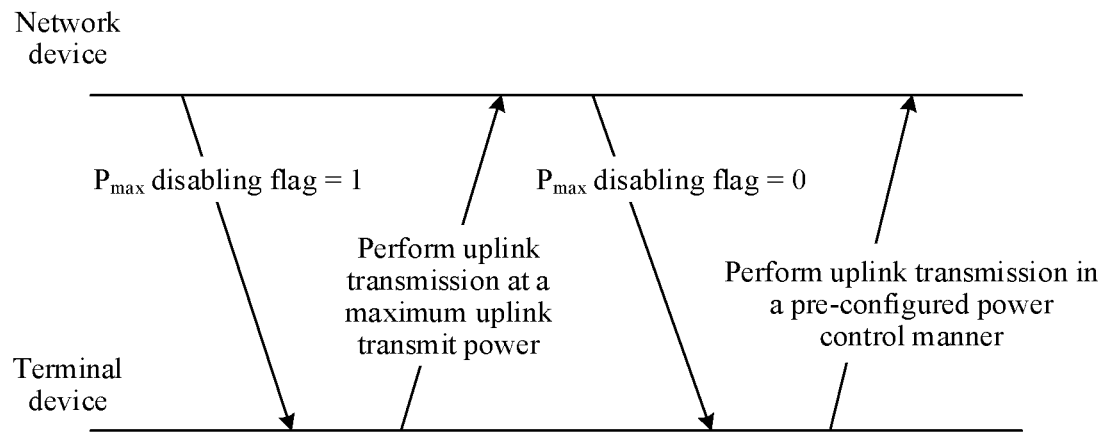
FIG. 5 is a schematic diagram of a dynamic power control method according to an embodiment of this application.

In another possible implementation, the network device may dynamically adjust a power control manner of the terminal device. For example, the network device may indicate, by using $P_{max}$ disabling flag ($P_{max}$ disabling flag) signaling, whether power adjustment needs to be performed at the maximum transmit power. As shown in FIG. 5, when a $P_{max}$ disabling flag sent by the network device to the terminal device is on (that is, the $P_{max}$ disabling flag=1), it indicates the terminal device to perform uplink transmission with the network device at the maximum uplink transmit power. When a $P_{max}$ disabling flag sent by the network device to the terminal device is off (that is, the $P_{max}$ disabling flag=0), it indicates the terminal device to perform uplink transmission with the network device in the pre-configured power control manner.

420: The terminal device communicates with the network device at the third uplink transmit power.

For example, when the third uplink transmit power is an uplink transmit power used when the terminal device sends a PUSCH to the network device, the terminal device may send the PUSCH to the network device at the third uplink transmit power. When the third uplink transmit power is an uplink transmit power used when the terminal device sends a PUCCH to the network device, the terminal device may send the PUCCH to the network device at the third uplink transmit power. However, this embodiment of this application is not limited thereto.

Therefore, in this embodiment of this application, the terminal device obtains the third uplink transmit power based on at least one of the transmit power of the terminal device and/or the path loss between the terminal device and the network device, and communicates with the network device at the third uplink transmit power. Based on the foregoing description, in this embodiment of this application, in a scenario in which a terrestrial terminal device communicates with a satellite network device, the uplink transmit power of the terminal device can be more flexibly controlled.

In addition, in this embodiment of this application, the method shown in FIG. 4 may be performed before the method shown in FIG. 2, or may be performed after the method shown in FIG. 2. In other words, before the terminal device hands over from the source network device to the target network device, the power control method shown in FIG. 4 may be used to control the uplink transmit power used when the terminal device communicates with the source network device. After the terminal device hands over from the source network device to the target network device, the power control method shown in FIG. 4 may be used to control the uplink transmit power used when the terminal device communicates with the target network device.

Figure 6:
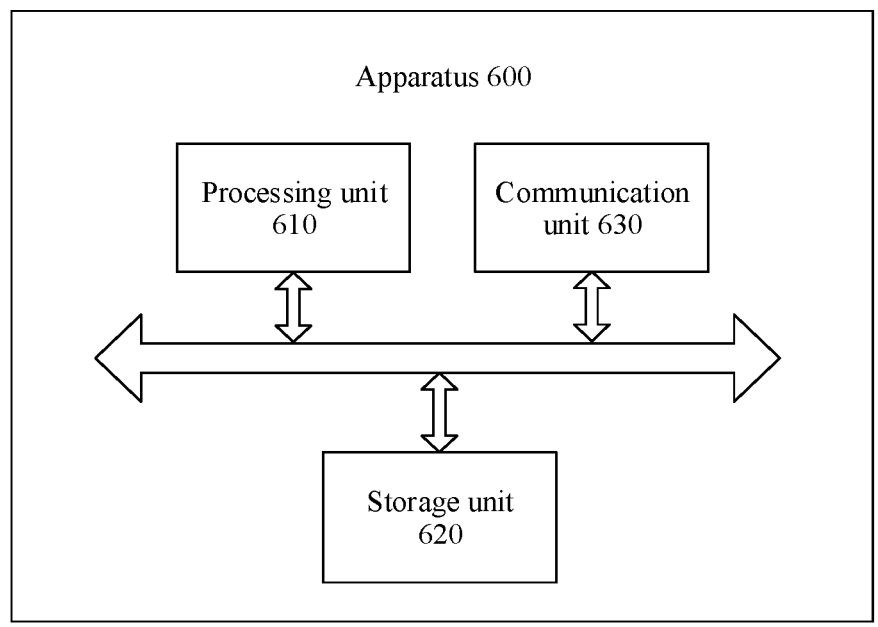
FIG. 6 is a schematic diagram of a wireless communication apparatus according to an embodiment of this application.

According to the foregoing method, FIG. 6 is a schematic diagram of a wireless communication apparatus 600 according to an embodiment of this application.

In a possible manner, the apparatus 600 may include a processing unit 610 (namely, an example of a processor) and a communication unit 630. In some possible implementations, the processing unit 610 may further be referred to as a determining unit, and the communication unit 630 may further be referred to as a transceiver unit. In some possible implementations, the transceiver unit may include a receiving unit and a sending unit.

Optionally, the communication unit 630 may be implemented by using a transceiver, a transceiver-related circuit, or an interface circuit.

Optionally, the apparatus may further include a storage unit 620. In a possible manner, the storage unit 620 is configured to store instructions. Optionally, the storage unit may alternatively be configured to store data or information. The storage unit 620 may be implemented by using a memory.

In some possible designs, the processing unit 610 is configured to execute the instructions stored in the storage unit 620, to enable the apparatus 600 to implement steps performed by the terminal device in the foregoing method. Alternatively, the processing unit 610 may be configured to invoke the data in the storage unit 620, to enable the apparatus 600 to implement steps performed by the terminal device in the foregoing method.

In some possible designs, the processing unit 610 is configured to execute the instructions stored in the storage unit 620, to enable the apparatus 600 to implement steps performed by the network device in the foregoing method. Alternatively, the processing unit 610 may be configured to invoke the data in the storage unit 620, to enable the apparatus 600 to implement steps performed by the network device in the foregoing method.

For example, the processing unit 610, the storage unit 620, and the communication unit 630 may communicate with each other by using an internal connection path, to transfer a control signal and/or a data signal. For example, the storage unit 620 is configured to store a computer program, and the processing unit 610 may be configured to invoke the computer program from the storage unit 620 and run the computer program, to control the communication unit 630 to receive a signal and/or send a signal, to complete steps performed by the terminal device or the network device in the foregoing method. The storage unit 620 may be integrated into the processing unit 610, or may be disposed separately from the processing unit 610.

Optionally, if the apparatus 600 is a communication device (for example, a terminal device or a network device), the communication unit 630 includes a receiver and a transmitter. The receiver and the transmitter may be a same physical entity or different physical entities. When the receiver and the transmitter are a same physical entity, the receiver and the transmitter may be collectively referred to as a transceiver.

Optionally, if the apparatus 600 is a chip or a circuit, the communication unit 630 includes an input interface and an output interface.

In an implementation, a function of the communication unit 630 may be implemented by using a transceiver circuit or a special-purpose transceiver chip. It may be considered that the processing unit 610 may be implemented by using a special-purpose processing chip, a processing circuit, a processing unit, or a general-purpose chip.

In another implementation, the communication apparatus (for example, a terminal device or a network device) provided in this embodiment of this application may be implemented by using a general-purpose computer. In other words, program code for implementing functions of the processing unit 610 and the communication unit 630 is stored in the storage unit 620, and a general-purpose processing unit implements the functions of the processing unit 610 and the communication unit 630 by executing the code in the storage unit 620.

In some embodiments, the apparatus 600 may be a terminal device, or a chip or a circuit disposed in a terminal device. For example, the terminal device may correspond to the terminal device in the embodiment in FIG. 2 or FIG. 4.

In an embodiment, when the apparatus 600 may be a terminal device, or a chip or a circuit disposed in a terminal device, units in the apparatus 600 are separately configured to perform the following operations and/or processing.

The processing unit 610 is configured to adjust, based on a first parameter, a first uplink transmit power used when a terminal device communicates with a source network device, to determine a second uplink transmit power used when the terminal device communicates with a target network device, where a path loss between the terminal device and the source network device is different from a path loss between the terminal device and the target network device, and the first parameter includes a first compensation value of the first uplink transmit power and/or a second compensation value of a path loss factor corresponding to the first uplink transmit power.

The communication unit 630 is configured to communicate with the target network device at the second uplink transmit power in a process in which the terminal device hands over from the source network device to the target network device.

In some possible implementations, the first parameter is determined based on a delay parameter and/or a distance parameter between the terminal device and the source network device, and a delay parameter and/or a distance parameter between the terminal device and the target network device.

In some possible implementations, the second uplink transmit power is less than or equal to a maximum uplink transmit power of the terminal device.

In some possible implementations, the communication unit 630 is further configured to receive first indication information, where the first indication information is used to indicate the first parameter.

In some possible implementations, the processing unit 610 is further configured to determine a third uplink transmit power, where the third uplink transmit power is determined based on at least one of a transmit power of the terminal device and the path loss between the terminal device and the target network device.

The communication unit 630 is further configured to communicate with the target network device at the third uplink transmit power.

In some possible implementations, the communication unit 630 is further configured to receive second indication information, where the second indication information is used to indicate the third uplink transmit power.

In some possible implementations, the third uplink transmit power is a maximum uplink transmit power of the terminal device, or an uplink transmit power determined in a pre-configured uplink power control manner.

In another embodiment, when the apparatus 600 may be a terminal device, or a chip or a circuit disposed in a terminal device, units in the apparatus 600 are separately configured to perform the following operations and/or processing.

The processing unit 610 is configured to determine a third uplink transmit power, where the third uplink transmit power is determined based on at least one of a transmit power of the terminal device and the path loss between the terminal device and the network device.

The communication unit 630 is configured to communicate with the target network device at the third uplink transmit power.

In some possible implementations, the communication unit 630 is further configured to receive second indication information, where the second indication information is used to indicate the third uplink transmit power.

In some possible implementations, the third uplink transmit power is a maximum uplink transmit power of the terminal device, or an uplink transmit power determined in a pre-configured uplink power control manner.

When the apparatus 600 is configured in a terminal device or is a terminal device, modules or units in the apparatus 600 may be configured to perform actions or processing processes performed by the terminal device in the foregoing method. To avoid repetition, detailed description thereof is omitted herein.

In some embodiments, the apparatus 600 may be a network device, or a chip or a circuit disposed in a network device.

In an embodiment, when the apparatus 600 may be a network device, or a chip or a circuit disposed in a network device, units in the apparatus 600 are separately configured to perform the following operations and/or processing. In this case, the network device may correspond to the target network device in the embodiment in FIG. 2.

The processing unit 610 is configured to determine a first parameter, where the first parameter is used to adjust a first uplink transmit power used when a terminal device communicates with a source network device, to obtain a second uplink transmit power used when the terminal device communicates with a target network device, the first parameter includes a first compensation value of the first uplink transmit power and/or a second compensation value of a path loss factor corresponding to the first uplink transmit power, and a path loss between the terminal device and the source network device is different from a path loss between the terminal device and the target network device.

The communication unit 630 is configured to send first indication information to the terminal device, where the first indication information is used to indicate the first parameter.

In some possible implementations, the first parameter is determined based on a delay parameter and/or a distance parameter between the terminal device and the source network device, and a delay parameter and/or a distance parameter between the terminal device and the target network device.

In some possible implementations, the second uplink transmit power is less than or equal to a maximum uplink transmit power of the terminal device.

In some possible implementations, the processing unit 610 is further configured to determine a third uplink transmit power based on at least one of a transmit power of the terminal device and the path loss between the terminal device and the target network device.

The communication unit 630 is further configured to send second indication information to the terminal device, where the second indication information is used to indicate the third uplink transmit power.

In some possible implementations, the third uplink transmit power is a maximum uplink transmit power of the terminal device, or an uplink transmit power determined in a pre-configured uplink power control manner.

In another embodiment, when the apparatus 600 may be a network device, or a chip or a circuit disposed in a network device, units in the apparatus 600 are separately configured to perform the following operations and/or processing. In this case, the network device may correspond to the network device in the embodiment in FIG. 4.

The processing unit 610 is configured to determine a third uplink transmit power based on at least one of a transmit power of the terminal device and the path loss between the terminal device and the network device.

The communication unit 630 is configured to send second indication information to the terminal device, where the second indication information is used to indicate the third uplink transmit power.

In some possible implementations, the third uplink transmit power is a maximum uplink transmit power of the terminal device, or an uplink transmit power determined in a pre-configured uplink power control manner.

When the apparatus 600 is configured in a network device or is a network device, modules or units in the apparatus 600 may be configured to perform actions or processing processes performed by the network device in the foregoing method. To avoid repetition, detailed description thereof is omitted herein.

For concepts, explanations, detailed description, and other steps of the apparatus 600 that are related to the technical solution provided in the embodiments of this application, refer to description of the content in the foregoing method or other embodiments. Details are not described herein again.

Figure 7:
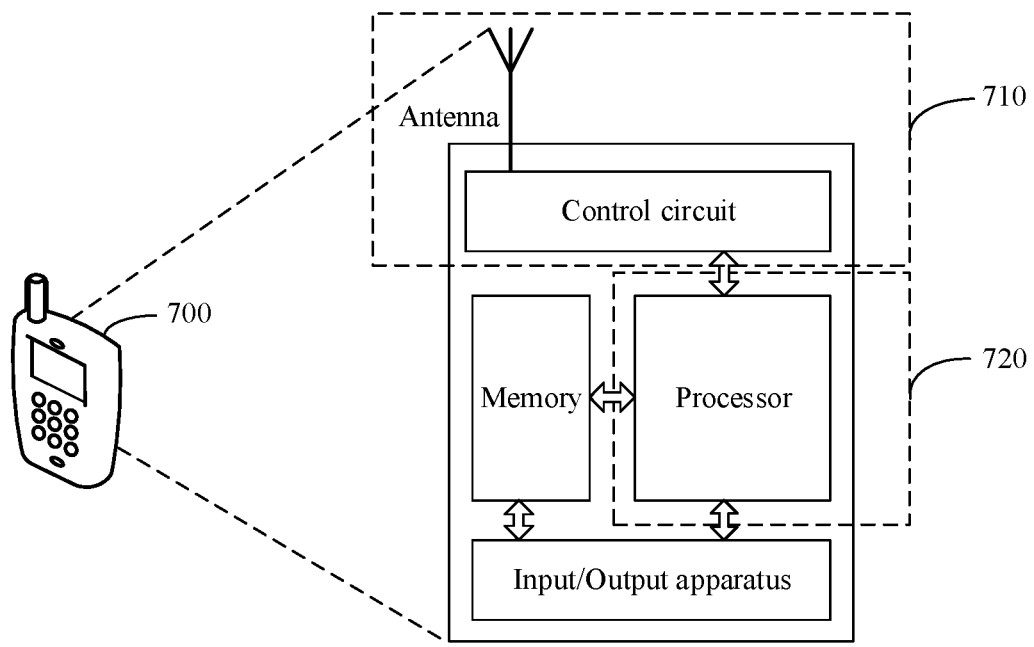
FIG. 7 is a schematic diagram of a structure of a terminal device according to this application.

FIG. 7 is a schematic diagram of a structure of a terminal device 700 according to this application. The terminal device 700 may be configured to perform an action performed by the terminal device in the foregoing method embodiments.

For ease of description, FIG. 7 shows only main components of the terminal device. As shown in FIG. 7, the terminal device 700 includes a processor, a memory, a control circuit, an antenna, and an input/output apparatus.

The processor is mainly configured to process a communication protocol and communication data, control the entire terminal device, execute a software program, and process data of the software program, for example, configured to support the terminal device in performing actions described in the foregoing embodiment of the power control method. The memory is mainly configured to store the software program and the data. The control circuit is mainly configured to: perform conversion between a baseband signal and a radio frequency signal, and process the radio frequency signal. A combination of the control circuit and the antenna may also be referred to as a transceiver, mainly configured to transmit and receive a radio frequency signal in a form of an electromagnetic wave. The input/output apparatus, for example, a touchscreen, a display screen, or a keyboard, is mainly configured to: receive data entered by a user, and output data to the user.

After the terminal device is powered on, the processor may read a software program in a storage unit, explain and execute instructions of the software program, and process data of the software program. When data needs to be sent in a wireless manner, after the processor performs baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 7 shows only one memory and one processor. In an actual terminal device, there may be a plurality of processors and a plurality of memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 7 integrates functions of the baseband processor and the central processing unit. A person skilled in the art may understand that the baseband processor and the central processing unit may be separate processors, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes a software program to implement a baseband processing function.

For example, in this embodiment of this application, the antenna and the control circuit that have receiving and sending functions may be considered as a transceiver unit 710 in the terminal device 700, and the processor having a processing function may be considered as a processing unit 720 in the terminal device 700. As shown in FIG. 7, the terminal device 700 includes the transceiver unit 710 and the processing unit 720. The transceiver unit may also be referred to as a transceiver, a transceiver machine, a transceiver apparatus, or the like. Optionally, a component that is in the transceiver unit 710 and that is configured to implement a receiving function may be considered as a receiving unit, and a component that is in the transceiver unit 710 and that is configured to implement a sending function may be considered as a sending unit. In other words, the transceiver unit includes the receiving unit and the sending unit. For example, the receiving unit may also be referred to as a receiver machine, a receiver, a receiver circuit, or the like, and the sending unit may be referred to as a transmitter machine, a transmitter, a transmitter circuit, or the like.

Figure 8:
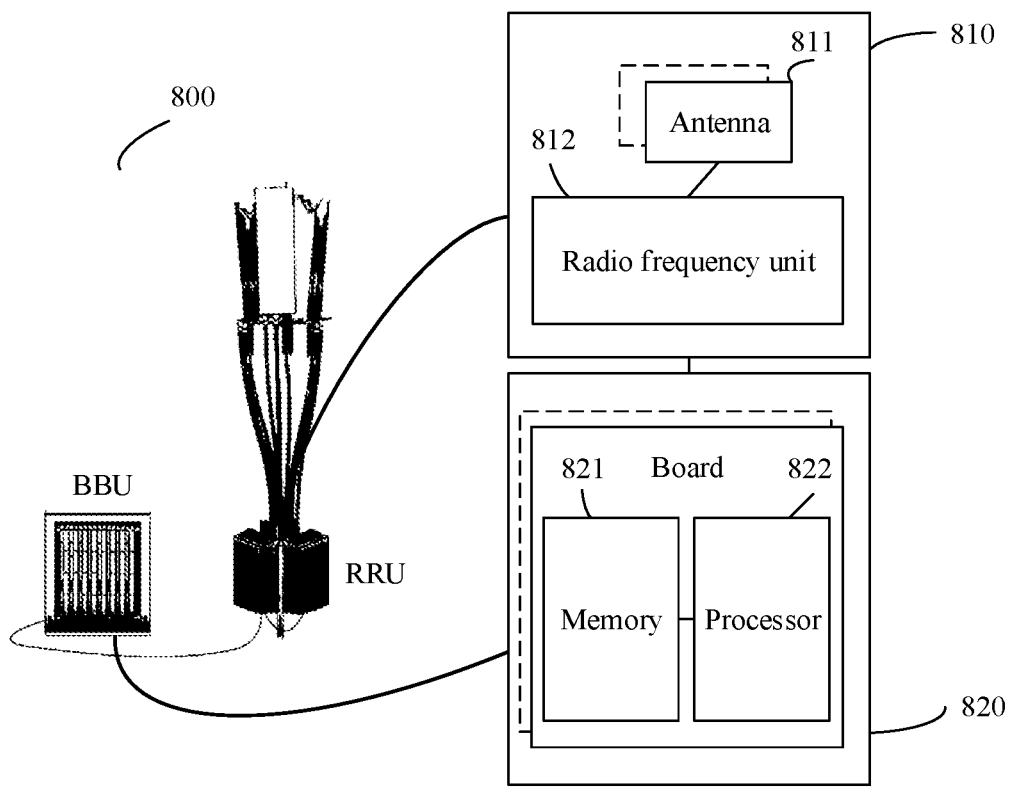
FIG. 8 is a schematic diagram of a structure of a network device according to an embodiment of this application.

FIG. 8 is a schematic diagram of a structure of a network device 800 according to an embodiment of this application. The network device 800 may be configured to implement a function of the network device (for example, the target network device) in the foregoing method. The network device 800 includes one or more radio frequency units, such as a remote radio unit (RRU) 810 and one or more baseband units (BBU) 820 (which may also be referred to as a digital unit (DU)). The RRU 810 may be referred to as a transceiver unit, a transceiver machine, a transceiver circuit, a transceiver, or the like, and may include at least one antenna 811 and a radio frequency unit 812. The RRU 810 part is mainly configured to: send and receive a radio frequency signal and perform conversion between a radio frequency signal and a baseband signal, for example, is configured to send the signaling message described in the foregoing embodiment to a terminal device. The BBU 820 part is mainly configured to perform baseband processing, control a base station, and the like. The RRU 810 and the BBU 820 may be physically disposed together, or may be physically separated, that is, a distributed base station.

The BBU 820 is a control center of the base station, may also be referred to as a processing unit, and is mainly configured to implement a baseband processing function such as channel encoding, multiplexing, modulation, or spreading. For example, the BBU (the processing unit) 820 may be configured to control a base station 40 to perform the operation procedure related to the network device in the foregoing method embodiment.

In an example, the BBU 820 may include one or more boards, and a plurality of boards may jointly support a radio access network (such as an LTE system or a 5G system) of a single access standard, or may separately support radio access networks of different access standards. The BBU 820 further includes a memory 821 and a processor 822. The memory 821 is configured to store necessary instructions and data. The processor 822 is configured to control the base station to perform a necessary action, for example, is configured to control the base station to perform the operation procedure related to the network device in the foregoing method embodiment. The memory 821 and the processor 822 may serve one or more boards. In other words, the memory and the processor may be separately disposed on each board. Alternatively, a plurality of boards may share a same memory and a same processor. In addition, a necessary circuit may further be disposed on each board.

In a possible implementation, with development of a system-on-a-chip (SoC) technology, all or some functions of the BBU 820 and the RRU 810 may be implemented by using the SoC technology, for example, implemented through a base station function chip. The base station function chip integrates components such as a processor, a memory, and an antenna interface. A program of a base station-related function is stored in the memory. The processor executes the program to implement the base station-related function. Optionally, the base station function chip can also read an external memory of the chip, to implement a related function of the base station.

It should be understood that the structure of the network device shown in FIG. 8 is merely a possible form, and should not constitute any limitation on this embodiment of this application. This application does not exclude a possibility that a base station structure of another form may appear in the future.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may further be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAMs) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions or computer programs. When the computer instructions or the computer programs are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium that stores a computer program. When the computer program is executed by a computer, steps performed by the terminal device or the network device in any one of the foregoing embodiments are implemented.

An embodiment of this application further provides a computer program product. When the computer program product is executed by a computer, steps performed by the terminal device or the network device in any one of the foregoing embodiments are implemented.

An embodiment of this application further provides a system chip. The system chip includes a communication unit and a processing unit. The processing unit may be, for example, a processor. The communication unit may be, for example, a communication interface, an input/output interface, a pin, a circuit, or the like. The processing unit may execute computer instructions, so that the chip in a communication apparatus performs steps performed by the terminal device or the network device in the foregoing embodiments of this application.

Optionally, the computer instructions are stored in a storage unit.

According to the method in the embodiments of this application, an embodiment of this application further provides a communication system, including the network device and the terminal device described above.

The embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

It should be understood that the term "and/or" describes an association relationship for describing associated objects and represents that three relationships may exist. For example, A and/or B may represent the following three cases: Only A exists, both A and B exist, and only B exists. The character "/" usually represents an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

It should be understood that the terms "first", "second", and various sequence numbers in the foregoing embodiments are merely used for differentiation for ease of description, but are not intended to limit the scope of the embodiments of this application. For example, the terms are used to differentiate between different uplink transmit powers, different indication information, and the like.

It should further be understood that, in the foregoing embodiments, "obtained in advance" may include being indicated by signaling of the network device or being predefined, for example, defined in a protocol. "Pre-definition" may be implemented by prestoring corresponding code or a corresponding table in a device (for example, including the terminal device and the network device), or in another manner that may be used to indicate related information. A specific implementation is not limited in this application.

It should further be understood that "being stored" in the embodiments of this application may be "being stored in one or more memories". The one or more memories may be separately disposed, or may be integrated into an encoder, a translator, a processor, or a communication apparatus. Alternatively, a part of the one or more memories may be separately disposed, and a part of the one or more memories are integrated into a translator, a processor, or a communication apparatus. A type of the memory may be a storage medium in any form. This is not limited in this application.

It should further be understood that, the "protocol" in the embodiments of this application may be a standard protocol in the communication field, for example, may include an LTE protocol, an NR protocol, and a related protocol applied to a future communication system. This is not limited in this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a USB flash drive, a removable hard disk drive, a read-only memory (ROM), a random access memory (RAM), a magnetic disk, and an optical disc.

The foregoing description is merely specific implementations of this application, but the protection scope of this application is not limited thereto. Any variation or replacement that can be readily figured out by a person skilled in the art within the technical scope disclosed in this application shall fall within the protection scope of this application. Therefore, the protection scope of this application shall be subject to the protection scope of the claims.

What is claimed is:

1. A power control method, comprising:
adjusting, based on a first parameter, a first uplink transmit power for a terminal device to communicate with a source network device to determine a second uplink transmit power for the terminal device to communicate with a target network device, wherein a path loss between the terminal device and the source network device is different from a path loss between the terminal device and the target network device, and wherein the first parameter comprises at least one of a first compensation value of the first uplink transmit power or a second compensation value of a path loss factor corresponding to the first uplink transmit power; and
communicating with the target network device using the second uplink transmit power in a process of handing over the terminal device from the source network device to the target network device.

2. The method according to claim 1, wherein the first parameter is determined based on at least one of a delay parameter or a distance parameter between the terminal device and the source network device, and at least one of a delay parameter or a distance parameter between the terminal device and the target network device.

3. The method according to claim 1, wherein the second uplink transmit power is less than or equal to a maximum uplink transmit power of the terminal device.

4. The method according to claim 1, further comprising:
receiving first indication information, wherein the first indication information indicates the first parameter.

5. The method according to claim 1, wherein the method further comprises:
- after the terminal device hands over from the source network device to the target network device, determining a third uplink transmit power, wherein the third uplink transmit power is determined based on at least one of a transmit power of the terminal device, the path loss between the terminal device, or the target network device; and
- communicating with the target network device at the third uplink transmit power.

6. The method according to claim 5, further comprising:
- receiving second indication information, wherein the second indication information indicates the third uplink transmit power.

7. The method according to claim 5, wherein the third uplink transmit power is a maximum uplink transmit power of the terminal device, or an uplink transmit power determined in a pre-configured uplink power control manner.

8. A power control method, comprising:
- determining a first parameter, wherein the first parameter is used to adjust a first uplink transmit power of a terminal device for communicating with a source network device to obtain a second uplink transmit power for the terminal device to communicate with a target network device, wherein the first parameter comprises at least one of a first compensation value of the first uplink transmit power or a second compensation value of a path loss factor corresponding to the first uplink transmit power, and wherein a path loss between the terminal device and the source network device is different from a path loss between the terminal device and the target network device; and
- sending first indication information to the terminal device, wherein the first indication information indicates the first parameter.

9. The method according to claim 8, wherein the first parameter is determined based on at least one of a delay parameter or a distance parameter between the terminal device and the source network device, and at least one of a delay parameter or a distance parameter between the terminal device and the target network device.

10. The method according to claim 8, wherein the second uplink transmit power is less than or equal to a maximum uplink transmit power of the terminal device.

11. The method according to claim 8, further comprising:
- determining a third uplink transmit power based on at least one of a transmit power of the terminal device and the path loss between the terminal device and the target network device; and
- sending second indication information to the terminal device, wherein the second indication information is used to indicate the third uplink transmit power.

12. The method according to claim 11, wherein the third uplink transmit power is a maximum uplink transmit power of the terminal device, or an uplink transmit power determined in a pre-configured uplink power control manner.

13. A power control apparatus, comprising:
- at least one processor; and
- at least one non-transitory memory coupled to the at least one processor and storing programming instructions for execution by the at least one processor to:
  - adjust, based on a first parameter, a first uplink transmit power for a terminal device comprising the apparatus to communicate with a source network device to determine a second uplink transmit power for the terminal device to communicate with a target network device, wherein a path loss between the terminal device and the source network device is different from a path loss between the terminal device and the target network device, and wherein the first parameter comprises at least one of a first compensation value of the first uplink transmit power or a second compensation value of a path loss factor corresponding to the first uplink transmit power; and
  - communicate with the target network device using the second uplink transmit power in a process of handing over the terminal device from the source network device to the target network device.

14. The apparatus according to claim 13, wherein the first parameter is determined based on at least one of a delay parameter or a distance parameter between the terminal device and the source network device, and at least one of a delay parameter or a distance parameter between the terminal device and the target network device.

15. The apparatus according to claim 13, wherein the second uplink transmit power is less than or equal to a maximum uplink transmit power of the terminal device.

16. The apparatus according to claim 13, wherein the programming instructions are for execution by the at least one processor to:
- receive first indication information, wherein the first indication information indicates the first parameter.

17. The apparatus according to claim 13, wherein the programming instructions are for execution by the at least one processor to:
- after the terminal device hands over from the source network device to the target network device, determine a third uplink transmit power, wherein the third uplink transmit power is determined based on at least one of a transmit power of the terminal device and the path loss between the terminal device and the target network device; and
- communicate with the target network device at the third uplink transmit power.

18. The apparatus according to claim 17, wherein the programming instructions are for execution by the at least one processor to:
- receive second indication information, wherein the second indication information indicates the third uplink transmit power.

19. The apparatus according to claim 17, wherein the third uplink transmit power is a maximum uplink transmit power of the terminal device, or an uplink transmit power determined in a pre-configured uplink power control manner.

20. The apparatus according to claim 13, wherein the apparatus is a chip.

* * * * *